US011128793B2

(12) United States Patent
Therkelsen et al.

(10) Patent No.: US 11,128,793 B2
(45) Date of Patent: Sep. 21, 2021

(54) SPEAKER TRACKING IN AUDITORIUMS

(71) Applicant: Cisco Technology, Inc., San Jose, CA (US)

(72) Inventors: Asbjorn Therkelsen, Nesbru (NO); Pascal Hubert Huart, Maisons Laffitte (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 158 days.

(21) Appl. No.: 16/402,653

(22) Filed: May 3, 2019

(65) Prior Publication Data
US 2020/0351435 A1 Nov. 5, 2020

(51) Int. Cl.
*G06K 9/00* (2006.01)
*H04N 5/232* (2006.01)
*H04N 7/15* (2006.01)

(52) U.S. Cl.
CPC ..... *H04N 5/23219* (2013.01); *H04N 5/23206* (2013.01); *H04N 5/23299* (2018.08); *H04N 7/152* (2013.01); *H04N 7/155* (2013.01)

(58) Field of Classification Search
CPC .......... H04N 5/23206; H04N 5/23219; H04N 5/23299; H04N 7/152; H04N 7/155; H04N 5/247; H04N 7/147; H04N 7/15
See application file for complete search history.

(56) References Cited

U.S. PATENT DOCUMENTS

| 7,343,289 | B2 | 3/2008 | Cutler et al. | |
| 7,403,217 | B2 | 7/2008 | Schulz et al. | |
| 9,071,895 | B2 | 6/2015 | Cutler | |
| 9,307,200 | B2 | 4/2016 | Aarrestad et al. | |
| 9,621,795 | B1* | 4/2017 | Whyte | H04R 3/005 |
| 2008/0246833 | A1* | 10/2008 | Yasui | H04N 7/142 348/14.08 |
| 2015/0195489 | A1* | 7/2015 | Sobti | H04N 7/142 348/14.08 |

(Continued)

OTHER PUBLICATIONS

Pushpa D. et al., "Precise multiple object identification and tracking using efficient visual attributes in dense crowded scene with regions of rational movement", IJCSI International Journal of Computer Science Issues, vol. 9, Issue 2, No. 2, Mar. 2012, 10 pages.

(Continued)

*Primary Examiner* — Tom Y Lu
(74) *Attorney, Agent, or Firm* — Edell, Shapiro & Finnan, LLC

(57) ABSTRACT

An endpoint deployed in a room may analyze a video output of a video camera disposed within the room for an image of a microphone disposed within the room. Based on the analyzing, the endpoint may then detect the image of the microphone within the video output of the video camera. The endpoint may then determine if the microphone is receiving speech from an active speaking participant, who may be one of the one or more participants that are disposed within the room. In the event the microphone is receiving speech from the active speaking participant, the endpoint may then display on a video display the video output of the video camera that has been altered to show a framing of the active speaking participant.

20 Claims, 13 Drawing Sheets

(56) References Cited

U.S. PATENT DOCUMENTS

2017/0133036 A1* 5/2017 Cohen .................. G06T 7/73

OTHER PUBLICATIONS

Vrushali R. Patil et al., "Abandoned Object Detection in Public Areas", International Journal of Scientific Research and Education, vol. 4, Issue 09, pp. 5897-5906, Sep. 2016, ISSN(e):2321-7545, DOI: http://dx.doi.org/10.18535/ijsre/v4i09.13, 10 pages.

Jagdish Lal Raheja et al., "Lip-Contour based Speaker Activity Detection in smart environment", https://www.researchgate.net/publication/265127392_Lip-Contour_based_Speaker_Activity_Detection_in_Smart_Environments, Jul. 2013, 5 pages.

Punarjay Chakravarty et al., "Active Speaker Detection with Audio-Visual Co-training", Oct. 2016, https://www.researchgate.net/publication/309612231_Active_speaker_detection_with_audio-visual_co-training, DOI: 10.1145/2993148.2993172, 5 pages.

Yong Rui et al., "Building an Intelligent Camera Management System", https://dl.acm.org/citation.cfm?id=500141.500145, Sep. 30-Oct. 5, 2001, 11 pages.

Cisco, "Cisco Presenter Track", https://www.cisco.com/c/en/us/products/collaboration-endpoints/presenter-track.html, downloaded May 3, 2019, 2 pages.

AREC Inc., "AREC CI-T21/CI-T25 Professional Auto-Tracking PTZ Conferencing Camera", https://www.youtube.com/watch?v=WFIqbeclt-c, Jul. 10, 2018.

Action for Happiness, "Dalai Lama answers questions from the audience", https://www.youtube.com/watch?v=G1JjzW_NbUc, Feb. 5, 2016.

"Yolo-v3 and Yolo-v2 for Windows and Linux", https://github.com/AlexeyAB/darknet#how-to-train-to-detect-your-cust, downloaded May 3, 2019, 17 pages.

Liam Tung et al., "Google AI can pick out a single speaker in a crowd: Expect to see it in tons of products", https://www.zdnet.com/article/google-ai-can-pick-out-a-single-speaker-in-a-crowd-expect-to-see-it-in-tons-of-products/, Apr. 13, 2018, 15 pages.

HuddleCamHD, "USB 3.0 Auto Tracking Camera w/ HD-SDI", https://www.youtube.com/watch?v=nuYZk1jAr_I, Dec. 27, 2016.

RAVe[PUBS], "ISE 2018: iSmart Video Explains Their Wireless Microphone Tracking Camera", https://www.youtube.com/watch?v=f6Q8UB4ih50, Feb. 6, 2018.

Andrey Safronov, "kurento video chat with object tracking", https://www.youtube.com/watch?v=Ik2IsC5YKbc, Jul. 3, 2017.

Rhys Martin et al., "Multiple-Object Tracking in Cluttered and Crowded Public Spaces", https://arxiv.org/abs/1309.6391, Sep. 25, 2013, 10 pages.

Social Microphone, Inc., "Mycrophone", https://www.mycrophone.me/howitworks, copyright 2016, downloaded May 3, 2019, 7 pages.

UW RSE-Lab, "Re3: Real-Time Recurrent Regression Networks for Visual Tracking of Generic Objects", https://www.youtube.com/watch?v=RByCiOLIxug, Dec. 12, 2017.

Kite Army, "SOLOSHOT3 Optic25 | Robotic Action Camera—Best Demo & Review", https://www.youtube.com/watch?v=vTQRkTcQWI0, Nov. 15, 2017.

Catchbox, "What is Catchbox", https://catchbox.com/what-is-catchbox/, copyright 2019, downloaded May 3, 2019, 14 pages.

Joseph Redmon et al., "YOLO: Real-Time Object Detection", https://pjreddie.com/darknet/yolo/, downloaded May 3, 2019, 5 pages.

* cited by examiner

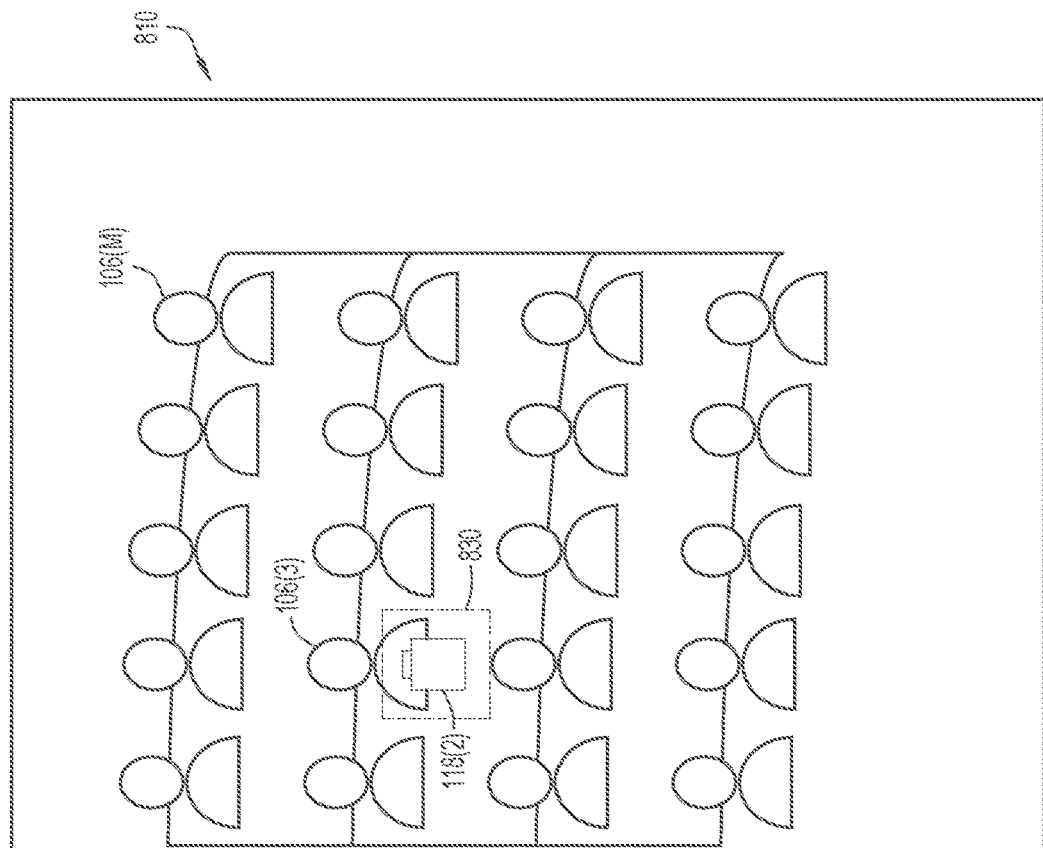
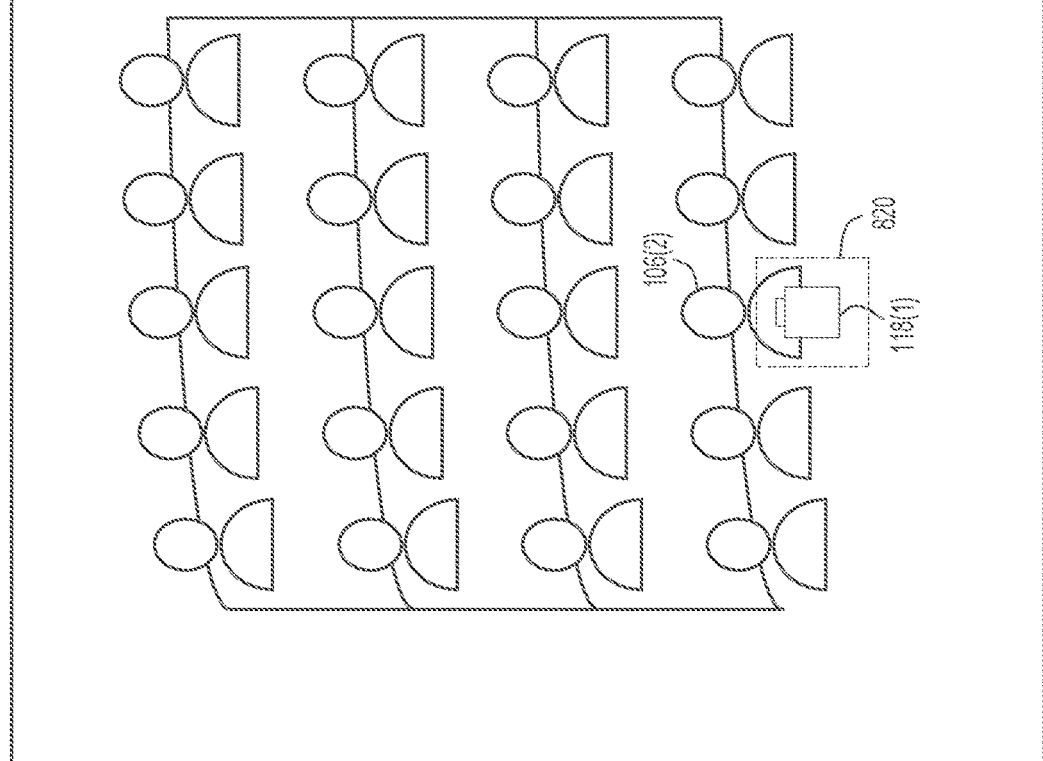
FIG. 8B

SPEAKER TRACKING IN AUDITORIUMS

The present disclosure relates a speaker tracking system.

BACKGROUND

Presentations may take place in front of large audiences that are located within large rooms, such as auditoriums, theaters, large classrooms, etc. These presentations sometimes contain interactive portions in the form of question and answer sessions in which participants of the audience ask questions of the presenter. Furthermore, these presentations may utilize in-room video displays and/or may transmit audio/video feeds of the presentations to far-end conference endpoints. Because of the large number of people in an audience, current speaker tracking systems that are utilized in conference and meeting rooms (i.e., that utilize microphone arrays and facial detection) are not able to scale well and are incapable of locating the active speaker in a large group of people. This often results in the utilization of a cameraman to manually locate and zoom in on an actively speaking audience member, where locating and zooming in on an actively speaking audience member may be delayed from the time that the audience member beings speaking. In addition, the passing around of microphones in an audience to potentially active speakers only provides an audio input to the room or conference system, and creates a delay between when the audience member wishes to speak and when that audience member can actually being speaking into a microphone. These current solutions do not provide a desirable user experience for those watching and participating in the presentation.

BRIEF DESCRIPTION OF THE DRAWINGS

FIG. 8B is an illustration of video output of the audience overview, according to an example embodiment.

DESCRIPTION OF EXAMPLE EMBODIMENTS

Overview

In one embodiment, an endpoint deployed in a room may analyze a video output of a video camera disposed within the room for an image of a microphone disposed within the room. Based on the analyzing, the endpoint may then detect the image of the microphone within the video output of the video camera. The endpoint may then determine if one or more participants is an active speaking participant, where the active speaking participant is determined from the one or more participants that are in proximity to the microphone. In the event the one of the participants is the active speaking participant, the endpoint may then display on a video display the video output of the video camera that has been altered to show a framing of the active speaking participant.

Example Embodiments

In one embodiment, techniques are provided to automatically determine the video output to display on a video display (either within the room containing the presentation and/or audience or at a far-end video conference endpoint) for presentations in front of a large audience. More specifically, techniques are provided to determine whether to display on a video display a video output of the presenter of a presentation, a video output of an overview of the audience of the presentation, or a video output of an audience member who is an active speaker at the presentation. The determination of which video output to display is at least partially determined by whether or not a microphone disposed within the room is detected through object recognition/detection performed on the video outputs of the video cameras in the room, and whether or not the microphone is receiving speech when detected. These techniques improve the audience member experience, as well as the user experience at the far-end video conference systems, because the actively speaking participant or presenter is automatically and quickly displayed on the video display.

Figure 1:
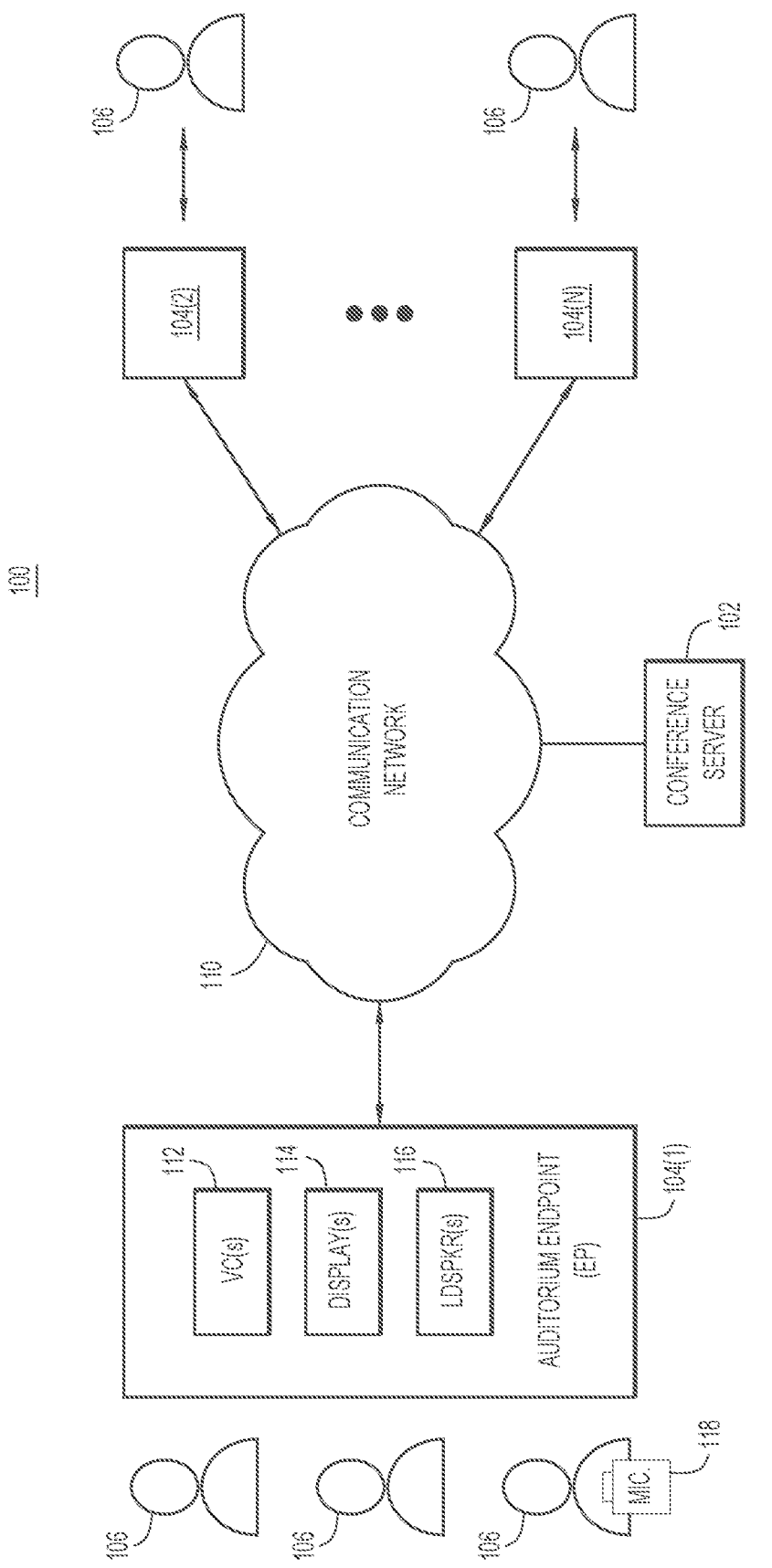
FIG. 1 is a block diagram of a video conference environment in which an auditorium endpoint utilizes a speaker tracking system deployed in an auditorium and displays, at the auditorium and at the one or more far-end video conference systems, a determined video output based on the active speaker at the auditorium, according to an example embodiment.

With reference to FIG. 1, there is depicted a block diagram of a video conference environment 100 in which a near-end video conference system deployed as an endpoint in an auditorium or other room capable of accommodating a large audience determines the video output to display on a display of the auditorium and/or of the far-end video conference systems. Video conference environment 100 includes two or more video conference endpoints 104(1)-104(N) often at different locations/sites operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints 104(1)-104(N). As explained in further detail below, auditorium endpoint 104(1) may be a video conference endpoint that is deployed with an auditorium or other type large room capable of accommodating large audiences, while video conference endpoints 104(2)-104(N) may be conventional video conference endpoints that are known in the art.

The auditorium endpoint 104(1) may include one or more video cameras (VC) 112. In addition, the auditorium endpoint 104(1) may include one or more displays 114 and loudspeakers 116 coupled to or integrated with the one or more displays 114. The auditorium endpoint 104(1) may also include one or more microphones 118. As described in further detail below, the microphones 118 may be wireless microphones that may be easily passed around or tossed between participants/audience members located at the auditorium endpoint 104(1). The auditorium endpoint 104(1) may be wired or wireless communication devices equipped with the aforementioned components, and may take on a variety of forms, such as, but not limited to, laptop and tablet computers, smartphones, IP phones, etc. In a transmit direction, auditorium endpoint 104(1) captures audio/video from their local participants 106 with one or more video cameras 112 and one or more microphones 118, encodes the captured audio/video into data packets, and transmit the data packets to other endpoints 104(2)-104(N) or to the conference server 102. In a receive direction, auditorium endpoint 104(1) may decode audio/video from data packets received from the conference server 102 or other endpoints 104(2)-104(N), and present the audio/video to their local participants 106 via the one or more loudspeakers 116 and displays 114.

Each far-end video conference endpoint 104(2)-104(N) may include one or more video cameras, a video display, a loudspeaker, and a microphone array, similar to that of conventional video conference endpoints. Endpoints 104(2)-104(N) may be wired or wireless communication devices equipped with the aforementioned components, such as, but not limited to laptop and tablet computers, smartphones, etc. In a transmit direction, endpoints 104(2)-104(N) capture audio/video from their local participants 106 with microphone arrays and video cameras, encode the captured audio/video into data packets, and transmit the data packets to the auditorium endpoint 104(1), other endpoints 104(1)-104(N), or to the conference server 102. In a receive direction, endpoints 104(2)-104(N) may decode audio/video from data packets received from the auditorium endpoint 104(1), the conference server 102, or other endpoints 104(2)-104(N) and present the audio/video to their local participants 106 via loudspeakers and displays.

Figure 2:
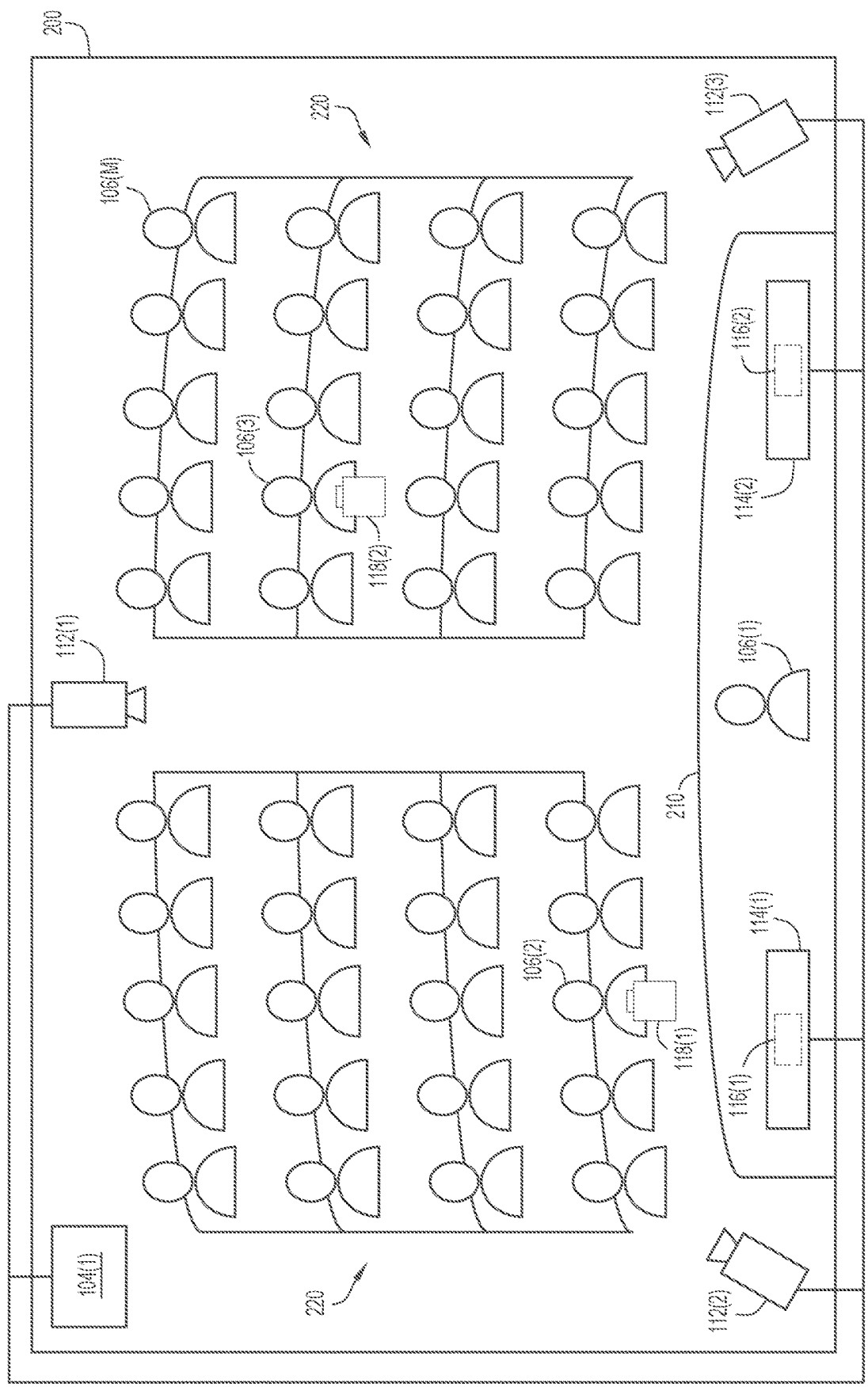
FIG. 2 is an illustration of an endpoint deployed in an auditorium where a presenter is disposed on a stage of the auditorium and participants are seated within the auditorium, and the endpoint is able to change/alter the video output that is displayed based on the participants that interact with the presenter, according to an example embodiment.

Referring now to FIG. 2, illustrated is an auditorium endpoint 104(1) deployed in an auditorium 200 (depicted simplistically as an outline in FIG. 2), according to an embodiment. It is noted that the term "auditorium" as used herein may refer to an auditorium, a large conference room, a theater, a large classroom, or any other room or venue capable of accommodating a large audience and a presenter. At one end of the auditorium 200 is a stage 210, where a presenter or on-stage speaker 106(1) is present. The auditorium 200 further includes multiple rows of seats 220, in which are various participants or audience members 106(2)-106(M).

The auditorium endpoint 104(1) depicted in FIG. 2 includes three video cameras 112(1)-112(3) positioned around the auditorium 200. Other embodiments of the auditorium endpoint 104(1), may contain any number of video cameras. The first video camera 112(1) may be disposed in the auditorium 200 opposite from the stage 210 such that the first video camera 112(1) may be configured to point towards the stage 210 (i.e., the stage 210 and the presenter 106(1) may be in the view of the first video camera 112(1)) to produce video outputs of the presenter 106(1) or anything else present on the stage 210. The second and third video cameras 112(2)-112(3) may be disposed in the auditorium 200 on either side of the stage 210 such that the second and third video cameras 112(2)-112(3) are configured to point towards the rows of seats 220 in the auditorium 200, and any participants 106(2)-106(M) that are seated or located in the auditorium 200. Thus, the second and third video cameras 112(2)-112(3) produce video outputs of the audience of the auditorium 200.

The video cameras 112(1)-112(3) may each be operated under control of the auditorium endpoint 104(1) to capture video of different views or scenes of the presenter 106(1) and multiple participants 106(2)-106(M) disposed within the auditorium 200. Each of the video cameras 112(1)-112(3) may include pan, tilt, and zoom (PTZ) features that may be implemented mechanically and/or digitally. Auditorium endpoint 104(1) may control the pan, tilt, and zoom features of each of the video cameras 112(1)-112(3) to capture video of different views/scenes of the presenter 106(1) and/or the participants 106(1)-106(M) within the auditorium 200. In addition, if a microphone is detected in an area close to the edge of an image, the pan, tilt, and zoom features of the video cameras 112(1)-112(3) may be used to keep the detected microphone close to the center of the image. In the embodiment illustrated, the presenter 106(1) is disposed on stage 210, and in view of the first video camera 112(1), while the participants 106(2)-106(M) are seated in rows of seats 220, and in view of the second and third video cameras 112(2)-112(3). In other embodiments, the participants 106(2)-106(M) may be standing in various locations about the auditorium 200.

As further illustrated in FIG. 2, disposed within the auditorium on the ends of the stage 210 are displays 114(1)-114(2). While only two displays 114(1)-114(2) are shown, any number of displays may be disposed within the auditorium 200, including zero displays. The displays 114(1)-114(2) may be configured to simultaneously display the same content, or different content, chosen by the auditorium endpoint 104(1). In some embodiments, the loudspeakers 116(1)-116(2) may be integrated with, or coupled to, their respective display 114(1)-114(2). While FIG. 2 illustrates the loudspeakers 116(1)-116(2) being disposed centrally on the displays 114(1)-114(2), respectively, it should be appreciated that the loudspeakers 116(1)-116(2) may be disposed in any location within or around the edge/frame of their respective displays 114(1)-114(2), or disposed anywhere throughout the auditorium 200.

As further illustrated in FIG. 2, two microphones 118(1)-118(2) are disposed within the auditorium 200. As further detailed below, the microphones 118(1)-118(2) may be wireless microphones 118(1)-118(2) that have a unique shape and design that enables them to be detected and recognized by the auditorium endpoint 104(1) using object detection techniques that analyze the video outputs of the video cameras 112(1)-112(3). The microphones 118(1)-118(2) may be configured to wirelessly send signals and data to the auditorium endpoint 104(1), regardless of their location within the auditorium 200. Thus, the microphones 118(1)-118(2) may be passed between participants 106(2)-106(M) in the auditorium 200, carried around the auditorium 200 by participants 106(2)-106(M), and even tossed around the auditorium 200 between participants 106(2)-106(M) while still being able to capture audio from the participants 106(2)-106(M) and send that captured audio to the auditorium endpoint 104(1). As illustrated in FIG. 2, the first microphone 118(1) may be in proximity of participant 106(2), while the second microphone 118(2) may be in proximity of participant 106(3). When multiple microphones 118(1)-118(2) are present within an auditorium 200, the microphones 118(1), may differ from one another in size, shape, color, design, and/or symbol. This enables the auditorium endpoint 104(1), when detecting/recognizing the microphones 118(1)-118(2) in the video outputs of the video cameras 112(1)-112(3), to determine which microphone 118(1)-118(2) is being detected.

Using the techniques presented herein, the auditorium endpoint 104(1) implements object detection/recognition techniques to detect the presence and location of microphones 118(1)-118(2) within the auditorium 200. When the presenter 106(1) is no longer actively speaking, and at least one of the microphones 118(1)-118(2) is detected within the participants of the audience 106(2)-106(M), the auditorium endpoint 104(1) may determine to display (on the displays 114(1)-114(2) or at the far end video conference endpoints 104(2)-104(N)) an overview of the audience within the auditorium 200 by displaying one of the video outputs of the second and/or third video cameras 112(2)-112(3). When the auditorium endpoint 104(1) determines that a person within proximity of the detected microphones 118(1)-118(2) is about to speak or is actively speaking into one of the detected microphone 118(1)-118(2), the auditorium endpoint 104(1) may alter one of the video outputs of the video cameras 112(1)-112(3) to present a close-up or zoomed in view of the actively speaking participant (e.g., 106(2) or 106(3) as illustrated in FIG. 2). In some embodiments, the auditorium endpoint 104(1) may further use participant detection techniques (e.g., facial detection techniques, motion detection techniques, upper body detection techniques, etc.) to detect participants 106(2)-106(M) and their location with respect to microphones 118(1)-118(2) in order to confirm that a participant 106(2)-106(M) is actively speaking or is about to actively speak into the microphone 118(1)-118(2). Once a video output has been determined and/or altered to frame an actively speaking participant 106(2)-106(M), the auditorium endpoint 104(1) may display the chosen video output on the displays 114(1)-114(2) disposed in the auditorium 200, or may send the chosen video output to the far-end video conference endpoints 104(2)-104(N) to enable far-end video conference endpoints 104(2)-104(N) to display the video output chosen by the auditorium endpoint 104(1). These techniques provide a seamless and automatic transition between displaying a presenter 106(1) and displaying actively speaking participants 106(2)-106(M) of the audience that improves the experience of the participants 106(2)-106(M) within the audience of the auditorium 200 and participants located at the far-end video conference endpoints 104(2)-104(N).

Figure 3:
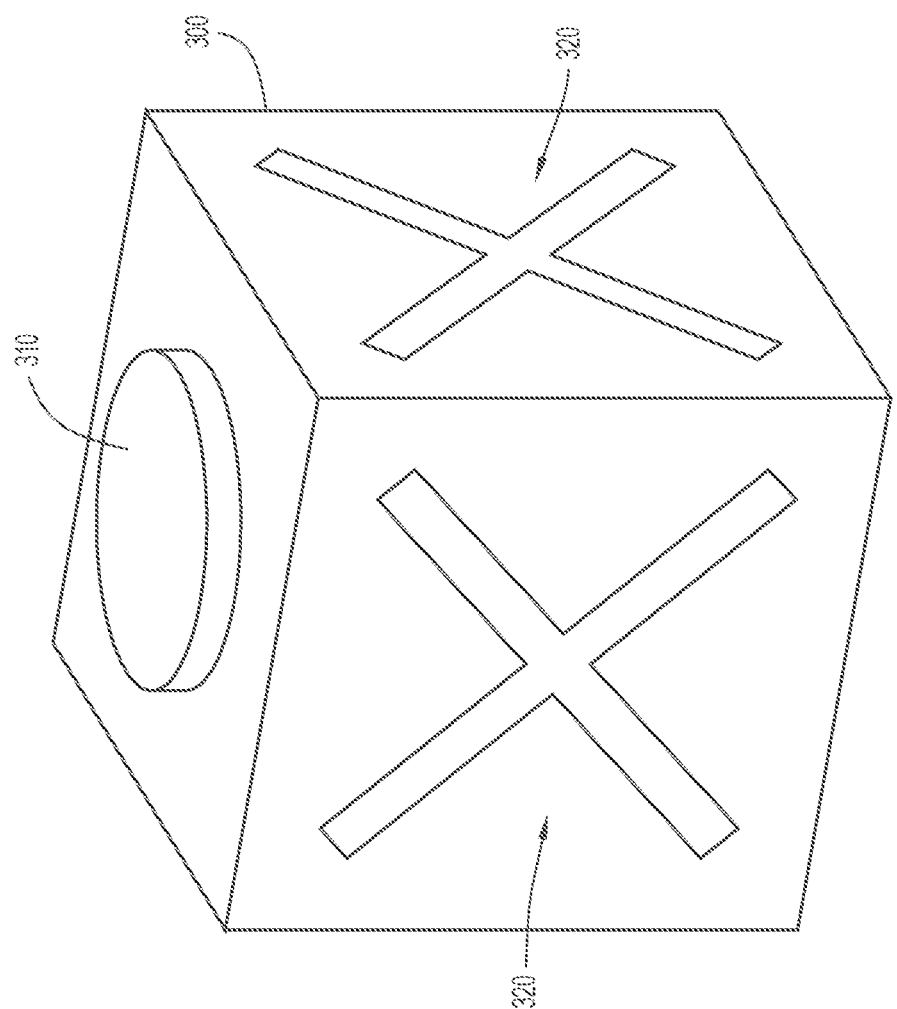
FIG. 3 is an illustration of a microphone used in the auditorium and in conjunction with the endpoint, according to an example embodiment.

With reference to FIG. 3, and continued reference to FIGS. 1 and 2, illustrated is an example embodiment of the microphone 118 that may be passed around and disposed in different locations throughout the auditorium 200. In the embodiment illustrated in FIG. 3, the microphone 118 may contain a body or base 300 and a grill or windscreen 310 disposed on at least one surface of the microphone body 300. As illustrated, the microphone body 300 is shaped like that of a cube, where the microphone grill 310 is disposed on the top surface of the microphone body 300. When using the microphone 118, a user of the microphone 118 may speak into the grill 310. While the microphone 118 illustrated in FIG. 3 has a body 300 that is cubic in shape, the microphone body 300 may be of any a unique and identifiable shape, including, but not limited to, prismatic, pyramidal, spherical, etc. In order to be more easily identifiable, the microphone body 300 may further be colored with an easily identifiable color, and the microphone body 300 may even contain an easily identifiable symbol 320 disposed on the sides of the microphone body 300. Because the microphone 118 may be passed, carried, or even tossed around the auditorium 200, the body 300 and the grill 310 may be constructed from soft materials, such as foam. In the event that multiple microphones 118(1)-118(2) are used within an auditorium, like that illustrated in FIG. 2, the microphones 118(1)-118(2), may be of differing size, differing shape, differing color, and/or contain different symbols. This enables the auditorium endpoint 104(1), when detecting the microphones 118(1)-118(2) to easily determine which microphone has been detected.

Figure 4:
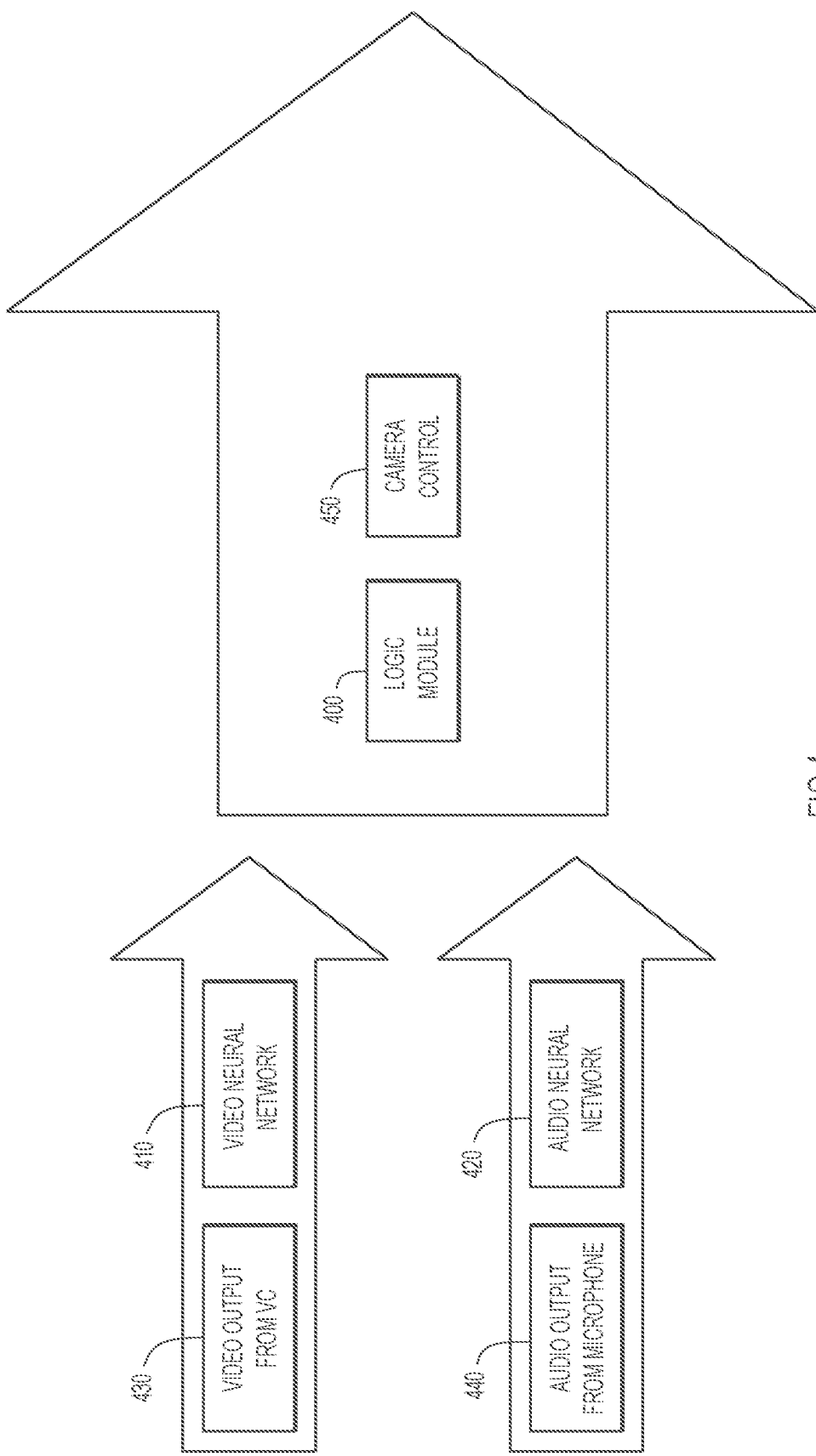
FIG. 4 is a flowchart depicting the machine learning techniques performed by the logic module of the endpoint to control the video output(s) of the camera(s), according to an example embodiment.

With reference to FIG. 4, and continued reference to FIGS. 1, 2, and 3, illustrated is a flowchart for machine learning of the logic module 400 of the auditorium endpoint 104(1) that contains neural networks 410, 420 configured to detect or recognize an image of one of the microphones 118(1)-118(2) within a video camera output and voice/speech received by the microphones 118(1)-118(2). The logic module 400 and neural networks 410, 420 may be disposed within the auditorium endpoint 104(1). Two neural networks, a video neural network 410 and an audio neural network 420, may be trained to enable the logic module 400 to accurately detect an image of the microphones 118(1)-118(2) within the outputs of the video cameras 112(1)-112(3) and voice/speech received by the microphone 118. In some embodiments, the training of the neural networks 410, 420 may be performed by a server, computer, or other device that is separate from the auditorium endpoint 104(1). When training, the video neural network 410 may be fed a video training dataset containing video outputs and/or images 430 from the video cameras 112(1)-112(3), where some of the training dataset images 430 include one or more of the microphones 118(1)-118(2), and some of the training dataset images 430 do not include the microphones 118(1)-118(2). For the training dataset images 430 that contain one or more of the microphones 118(1)-118(2), the images 430 may be labeled or marked with the position and size (e.g., in pixels) of the microphones 118(1)-118(2). Once trained, the video neural network 410 may output an indication of the presence of a microphone, the position of the microphone (e.g., in pixels), and/or the size of the microphone (e.g., in pixels). If the video neural network 410 is trained by a device different from the auditorium endpoint 104(1), then the trained video neural network 410 is loaded onto the auditorium endpoint 104(1).

When training, the audio neural network 420 may be fed an audio training dataset of audio clips 440 recorded by the microphones 118(1)-118(2) in order to train the audio neural network 420 to differentiate between detected noise and detected voice/speech. The audio clips 440 used for the training dataset may include audio clips of silence, audio clips of noise, and audio clips of a voice or speech received by the microphones 118(1)-118(2). Once trained, the audio neural network 420 may output an indication whether a detected input of a microphone is voice/speech, noise, or silence. If the audio neural network 420 is trained by a device different from the auditorium endpoint 104(1), then the trained audio neural network 420 is loaded onto the auditorium endpoint 104(1).

Continuing with FIG. 4, the logic module 400 may utilize the trained video neural networks 410 to detect the microphones 118(1)-118(2) within the video outputs from the video cameras 112(1)-112(3). The logic module 400 may also use the trained audio neural network 420 to detect whether or not a detected microphone 118(1)-118(2) is receiving voice/speech from one of the participants 106(2)-106(M) located within the audience of the auditorium 200 based on the received audio clips 440 from the microphone 118. Once the logic module 400 receives the outputs from the trained neural networks 410, 420, the logic module 400 may control at 450 the video cameras 112(1)-112(3) and/or alter or change the video outputs from the video cameras 112(1)-112(3), as detailed below.

Figure 5:
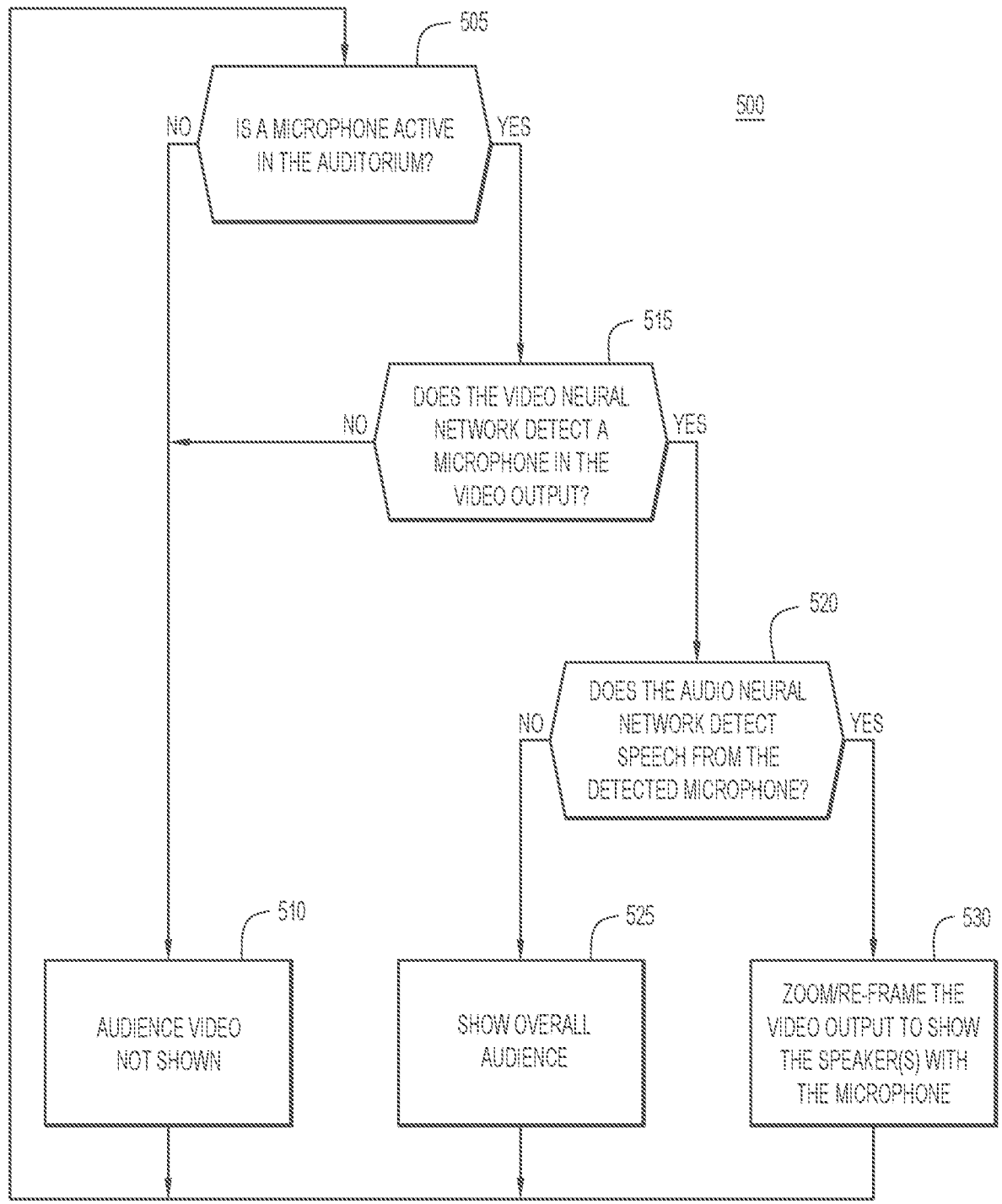
FIG. 5 is a flowchart depicting video output selection techniques performed by the endpoint to determine which video output to display.

Turning to FIG. 5, and with continued reference to FIGS. 1-4, illustrated is a flowchart of a method 500 utilized by the logic module 400 to control which of the video outputs of the video cameras 112(1)-112(3) to display. At 505, the logic module 400 determines whether or not the microphones 118(1)-118(2) are active within the auditorium 200. As previously explained, the microphones 118(1)-118(2) may be wireless microphones that can wirelessly send signals to the auditorium endpoint 104(1), such signals including, but not limited to, whether the microphones 118(1)-118(2) are on or off. If, at 505, the logic module 400 determines that the microphones 118(1)-118(2) are not activated or in an "on" state, then, at 510, the logic module 400 does not show a video output of an overview of the audience of the auditorium 200 (i.e., the video outputs from video cameras 112(2)-112(3)). In some embodiments, the logic module 400 may decide to display the video output of the first camera 112(1) to display the presenter 106(1) on the stage 210 of the auditorium 200. If, however, the logic module 400 determines that the microphones 118(1)-118(2) are activated or in an "on" state at 505, then, at 515, the logic module 400 utilizes the trained video neural network 410 to determine whether or not at least one of the microphones 118(1)-118(2) are detected or recognized in the video outputs of the video cameras 112(1)-112(3). If the video neural network 410 informs the logic module 400 that it does not detect a microphone 118(1)-118(2), then the logic module 400 returns to 510 and does not display a video output of an overview of the audience of the auditorium 200 (i.e., the video outputs from video cameras 112(2)-112(3)). However, if, at 515, the video neural network 410 informs the logic module 400 that it does detect at least one of the microphones 118(1)-118(2), then the logic module 400 continues to 520, where the logic module 400 utilizes the trained audio neural network 420 to determine whether or not the detected microphones 118(1)-118(2) are receiving a voice/speech input from a participant 106(2)-106(M). If the audio neural network 420 informs the logic module 400 that it does not detect voice/speech at one of the detected microphones 118(1)-118(2), then, at 525, the logic module 400 may display the video output of one or more of the video cameras 112(1)-112(3) that shows an overview of the audience of the auditorium 200 or of the stage 210. For the embodiment illustrated in FIG. 2, the logic module 400, in this instance, may display the video output from one or both of the video cameras 112(2)-112(3) on the displays 114(1)-114(2) (e.g., the video output of the second camera 112(2) may be displayed on both displays 114(1)-114(2), the video output of the second camera 112(2) may be displayed on the first display 114(1), while the video output of the third camera 112(3) may be displayed on the second display 114(2), etc.). However, if, at 520, the audio neural network 420 informs the logic module 400 that it does detect voice/speech from at least one of the detected microphones 118(1)-118(2), then the logic module 400 continues to 530, where the logic module 400 displays one of the video outputs of the video cameras 112(1)-112(3) after a zoom or reframing of the video output has been performed. The zoom or reframing of one of the video outputs of the video cameras 112(1)-112(3) is an altering of the video outputs of the video cameras 112(1)-112(3) to display a close-up view of the actively speaking participant 106(2)-106(3). For example, as illustrated in FIG. 2, if participant 106(2) is actively speaking into microphone 118(1), the logic module 400 may display on the displays 114(1)-114(2), or at the far-end video conference endpoints 104(2)-104(N), a close-up view of the actively speaking participant 106(2), which may be an altered video output of the second video camera 112(2).

Figure 6:
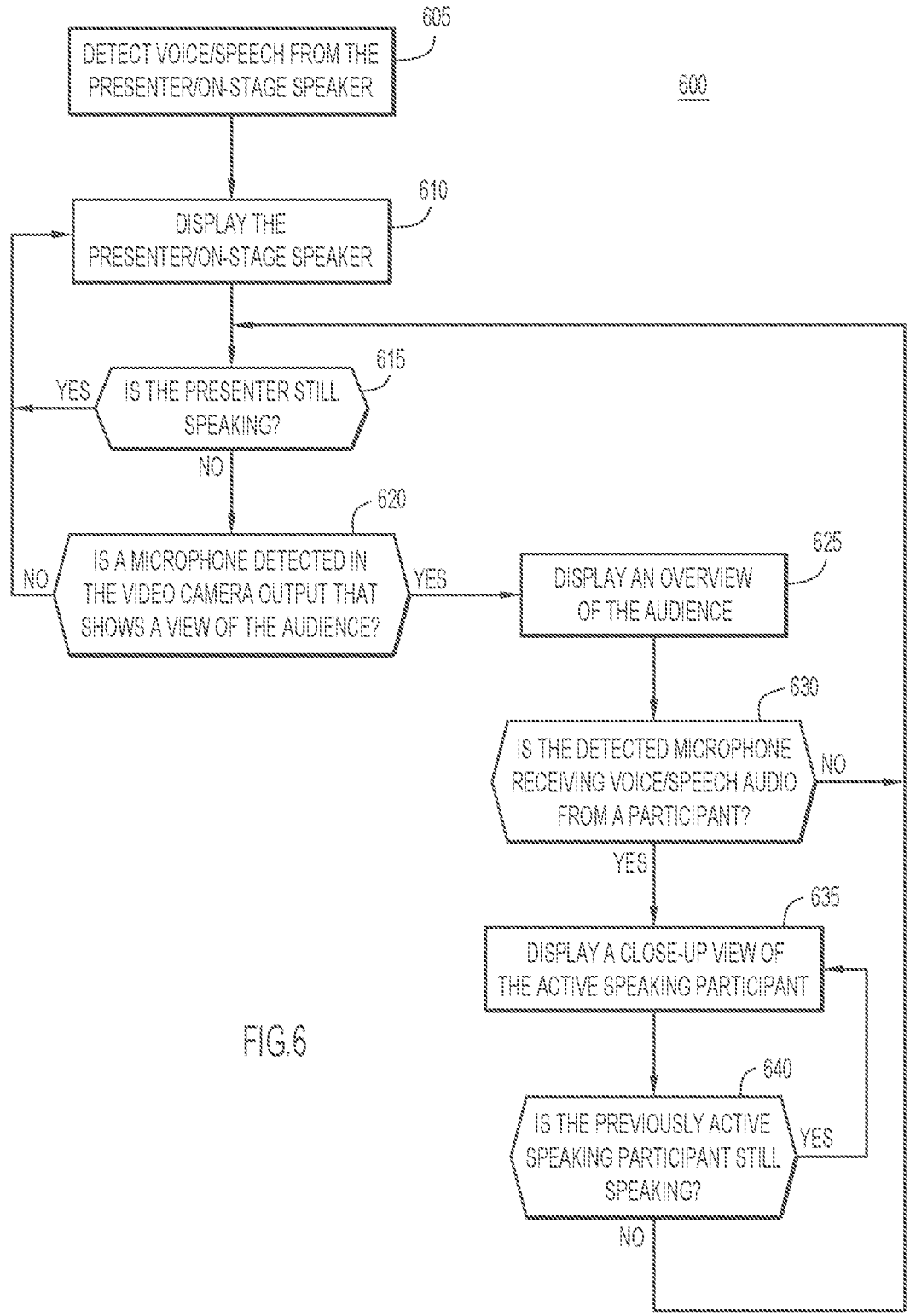
FIG. 6 is a flowchart depicting video output selection techniques performed by the endpoint to determine whether to display a view of the presenter or of an actively speaking participant in the audience.

Turning now to FIG. 6, and with continued reference to FIGS. 1-5, illustrated is a flowchart of the method 600 used by the logic module 400 for determining whether to display a view of the presenter 106(1) or of an actively speaking participant 106(2)-106(M). At 605, the logic module 400 may detect voice/speech originating from the presenter 106(1) located on the stage 210 of the auditorium 200. In some embodiments, detection of voice/speech of the presenter 106(1) may be similar to that of the detection of voice/speech at the microphones 118(1)-118(2), except the audio neural network 420 may analyze audio clips received from a personal microphone (not shown) of the presenter 106(1). When the logic module 400 receives an indication that the voice/speech is originating from the presenter 106(1), the logic module 400, at 610, displays a view (e.g., close-up view, wide angle view, etc.) of the presenter 106(1). As previously explained, the logic module 400 of the auditorium endpoint 104(1) may determine to display the view of the presenter 106(1) on the displays 114(1)-114(2) of the auditorium 200 and/or at the far-end video conference endpoints 104(2)-104(M). At 615, the logic module 400 checks to determine if the presenter 106(1) is still actively speaking. If, at 615, the logic module 400 determines that the presenter 106(1) is actively speaking, the logic module 400 returns to 610, where the logic module 400 continues to display the presenter 106(1). Thus, the logic module 400 may continuously verify that the presenter 106(1) is actively speaking while displaying the presenter 106(1). However, if the logic module 400 determines that the presenter 106(1) is not actively speaking at 615, the logic module 400 then determines, at 620, whether or not one of the microphones 118(1)-118(2) is detected in the video outputs of the video cameras 112(2)-112(3) that show an overview of the audience of the auditorium 200, as explained above. If one of the microphones 118(1)-118(2) is not detected in the video outputs of the video cameras 112(2)-112(3), the logic module 400 may revert back to 610 to continue to display the presenter 106(1) even if the presenter 106(1) is not actively speaking. For example, the presenter 106(1) may be performing a demonstration without actively speaking, and thus, should continue to be displayed by the logic module 400. If, however, the logic module 400 detects one of the microphones 118(1)-118(2) in the video outputs of the video cameras 112(2)-112(3) at 620 (i.e., via analysis performed by the trained video neural network 410), the logic module 400 may, at 625, display an overview of the audience via the video output of one or both of the video cameras 112(2)-112(3). The logic module 400 may display the video output of the overview of the audience at any one of the displays 114(1)-114(2) of the auditorium endpoint 104(1) and at the far-end video conference endpoints 104(2)-104(N).

Continuing with FIG. 6, the logic module 400 at 630 determines whether or not the detected microphones 118(1)-118(2) are receiving voice/speech inputs from an actively speaking participant 106(2)-106(M) within the audience of the auditorium 200. The logic module 400 may utilize the trained audio neural network 420, as described above with regard to FIG. 4, in order to determine whether or not the detected microphones 118(1)-118(2) are receiving voice/speech inputs from an actively speaking participant 106(2)-106(M). If, at 630, the logic module 400 determines that the detected microphones 118(1)-118(2) are not receiving voice/speech inputs from a participant 106(2)-106(M), then the logic module 400 returns to 615 to determine if the presenter 106(1) is speaking, and if not, determine, at 620, whether or not one of the microphones 118(1)-118(2) are still detected in the video outputs of the video cameras 112(2)-112(3). If, however, the logic module 400 determines that at least one of the detected microphones 118(1)-118(2) is receiving voice/speech inputs from a participant 106(2)-106(M), then the logic module 400, at 635, displays a close-up view of the actively speaking participant 106(2)-106(M). In one embodiment, at 635, the logic module 400 may utilize one of the cameras 112(2)-112(3) to optically zoom in on the actively speaking participant 106(2)-106(M) to display a close-up view of the actively speaking participant 106(1)-106(M). In another embodiment, at 635, the logic module 400 may perform a digital zoom on one of the video outputs of the video cameras 112(2)-112(3) to display a close-up view of the actively speaking participant 106(1)-106(M). In yet another embodiment, the logic module 400 may alter the framing of the video output of one of video cameras 112(2)-112(3) to display a close-up view of the actively speaking participant 106(1)-106(M). Because the trained video neural network 410 may output the position of the detected microphone 118(1)-118(2) and/or the size of the detected microphone 118(1)-118(2) in pixels, the logic module 400 is able to alter the video output of one of video cameras 112(2)-112(3) to the close-up view of the actively speaking participant 106(1)-106(M) based on the pixels identified by the video neural network 410.

At 640, the logic module 400 may then determine whether or not the identified actively speaking participant 106(2)-106(M) is still actively speaking. If, at 640 the detected participant 106(1)-106(M) is still actively speaking, the logic module 400 may return to 635 to continue to display a close-up view of the actively speaking participant 106(2)-106(M). However, if the logic module 400 determines at 640 that the detected participant 106(1)-106(M) is no longer actively speaking, the logic module 400 returns to 615 to determine if the presenter 106(1) is speaking, and if not, determine, at 620, whether or not one of the microphones 118(1)-118(2) are still detected in the video outputs of the video cameras 112(2)-112(3). The logic module 400 may be programmed to confirm that the detected participant 106(1)-106(M) is no longer actively speaking when the detected participant 106(1)-106(M) has not produced any voice/speech inputs within a predetermined amount of time (e.g., 3 seconds).

Figure 7:
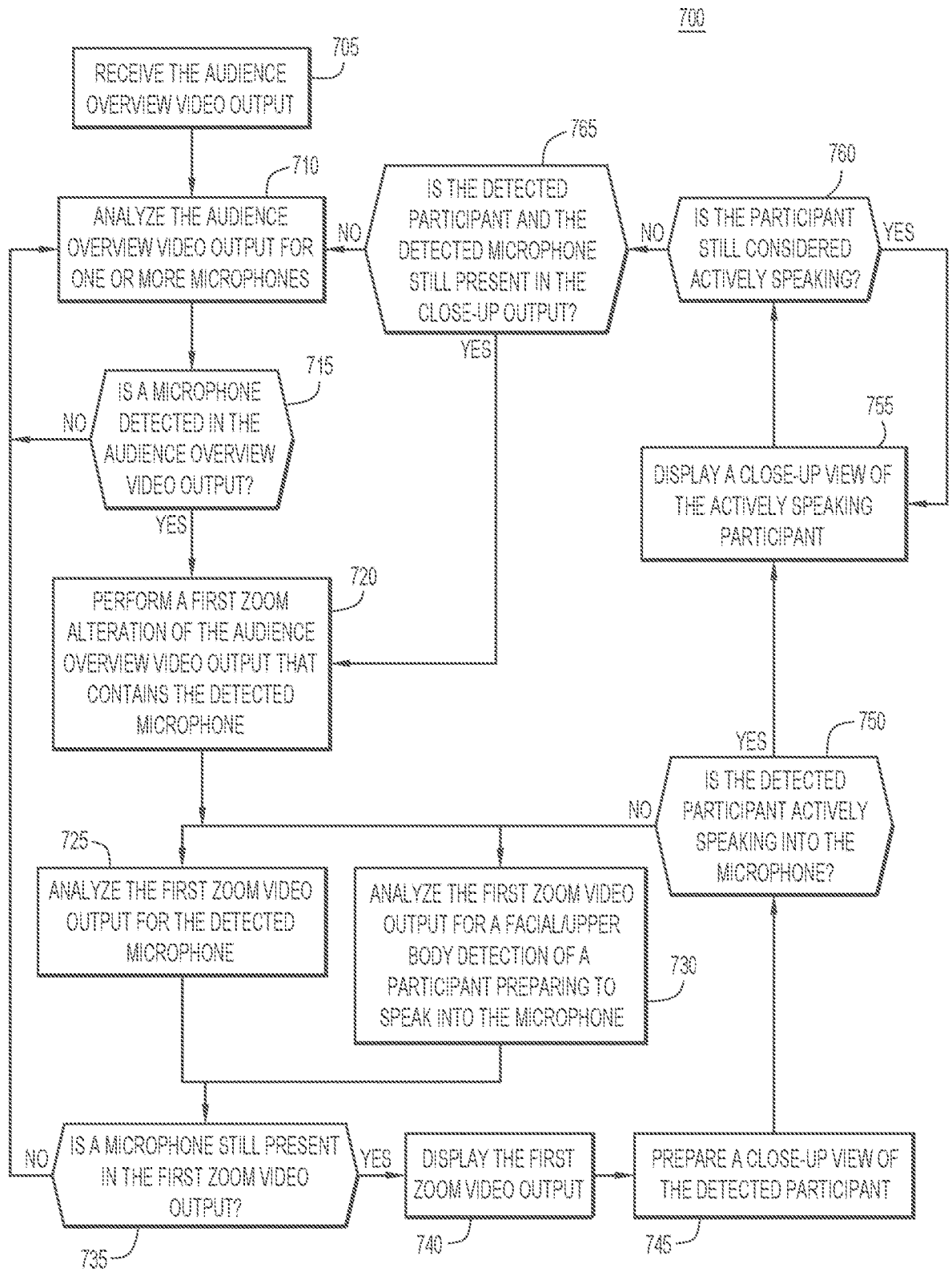
FIG. 7 is a flowchart depicting the microphone detection techniques performed by the endpoint to determine and verify detection of the microphone and detection of a participant that is actively speaking or preparing to actively speak, according to an example embodiment.

Turning to FIG. 7, and with continued reference to FIGS. 1-6, illustrated is a flowchart depicting a method 700 performed by the logic module 400 of the auditorium endpoint 104(1) to detect at least one of the microphones 118(1)-118(2) within the video outputs of the video cameras 112(2)-112(3), verify the detection of the microphones 118(1)-118(2), and confirm that at least one of the microphones 118(1)-118(2) is receiving voice/speech audio from one or more detected participants 106(2)-106(M) in proximity to the detected microphones 118(1)-118(2). Many of the steps of method 700 may be performed by the logic module 400 without altering or changing the video output that is displayed on the displays 114(1)-114(2) and at the far-end video conference endpoints 104(2)-104(N).

At 705, the logic module 400 receives the video output of an overview of the audience of the auditorium 200 from one of the video cameras 112(2)-112(3). This may be received while the logic module 400 is displaying the video output of video camera 112(1) of the presenter 106(1). The logic module 400, at 710, may analyze the received video outputs of the video cameras 112(2)-112(3) in order to detect one or more microphones 118(1)-118(2) within the auditorium 200. As explained previously, the logic module 400 may utilize a trained video neural network 410 to analyze the video outputs of the video cameras 112(2)-112(3). At 715, the logic module 400 then makes a determination as to whether or not one of the microphones 118(1)-118(2) are detected within the video output of the video cameras 112(2)-112(3) based on the output of the trained video neural network 410. If, at 715, the logic module 400 does not detect any microphones 118(1)-118(2) within the video output of the video cameras 112(2)-112(3), then the logic module 400 returns to 710 to continue to analyze received video outputs from the video cameras 112(2)-112(3). However, if the logic module 400 does detect at least one of the microphones 118(1)-118(2) within the video output of the video cameras 112(2)-112(3), then the logic module 400, at 720, performs a first zoom, or a half-zoom, of the video output of the video cameras 112(2)-112(3) that contains the detected microphone(s) 118(1)-118(2). The first zoom may be a partial zoom that does not zoom all the way to the pixels of the video output identified by the trained video neural network 410 as containing the detected microphone 118(1)-118(2). In other words, the first or half-zoom may not zoom fully into a close-up view of the participant(s) 106(2)-106(M) in the audience holding or within a proximity of the detected microphone(s) 118(1)-118(2). Performing the first zoom on the video outputs of the video cameras 112(2)-112(3) may not change the video output displayed by the logic module 400 (i.e., if the logic module 400 was displaying the video output of the first video camera 112(1), then that video output may remain displayed). The logic module 400 may perform a first zoom on the video output containing the detected microphone(s) 118(1)-118(2) by performing an optical zoom with the video camera 112(2)-112(3) or a digital zoom of the video output to the region of pixels indicated as containing the detected microphone(s) 118(1)-118(2).

Continuing with FIG. 7, the logic module 400 may then at 725, perform another object detection analysis on the first zoomed video outputs of the video cameras 112(2)-112(3) to verify that the previously detection of the microphones 118(1)-118(2), while simultaneously, at 730 performing participant detection techniques (e.g., facial detection techniques, motion detection techniques, upper body detection techniques, etc.) to detect the face or upper body of a participant 106(2)-106(M) within proximity of the detected microphone 118(1)-118(2) (i.e., the detected face and/or upper body the participant 106(1)-106(M) may be located behind, slightly above, or around the detected microphone 118(1)-118(2)). The analysis performed at 725 and 730 may be performed by the trained video neural network 410 of the logic module 400, in accordance with the description above of the trained video neural network 410. Thus, the trained video neural network 410 may output the location and size of the detected microphone 118(1)-118(2) and the detected participant 106(2)-106(M) in pixels of the video output. At 735, the logic module determines whether or not the previously detected microphone 118(1)-118(2) is still present in the first zoom video output of the video cameras 112(2)-112(3) based on the output of the trained video neural network 410. If, at 735, the previously detected microphone 118(1)-118(2) is no longer detected within the first zoom video output, then the logic module 400 returns to 710 to being a new objection detection analysis of the incoming video outputs of the video cameras 112(2)-112(3). If, however, the logic module 400 determines that the previously detected microphone 118(1)-118(2) is still detected within the first zoom video output, then, at 740, the logic module 400 may display the first zoom video output of the video cameras 112(2)-112(3) on one of the displays 114(1)-114(2). Then, at 745, the logic module 400 may prepare with the video output of the second or third video cameras 112(2)-112(3) a second zoom or close-up view of the detected participant 106(2)-106(M) from 730. This enables the logic module 400 to queue up the second zoom or close-up view of the detected participant 106(2)-106(M) and the detected microphone 118(1)-118(2) to display as soon as the logic module 400 receives an indication that the detected microphone 118(1)-118(2) receives a voice/speech input. The logic module 400 may perform the second zoom on the video output containing the detected microphone(s) 118(1)-118(2) and the detected participant 106(2)-106(M) by performing an optical zoom with the video camera 112(2)-112(3) or a digital zoom of the video output to the region of pixels indicated as containing detected participant 106(2)-106(M).

At 750, the logic module 400 determines if the detected participant 106(2)-106(M) is actively speaking into the detected microphone 118(1)-118(2), where the determination may be made based on the output of the trained audio neural network 420 performing an analysis on audio clips received by the detected microphone 118(1)-118(2). In some embodiments, the detection of the participant 106(2)-106(M) within a certain position with respect to the detected microphone 118(1)-118(2) (i.e., the detected head and/or torso of the participant 106(2)-106(M) being positioned behind or in proximity with the detected microphone 118(1)-118(2)) may trigger the logic module 400 to classify the detected participant 106(2)-106(M) as actively speaking. For example, the detection of a head or torso of the participant 106(2)-106(M) as being consistent with a person who is preparing to speak into the microphone 118(1)-118(2) (i.e., the holding pattern of the microphone 118(1)-118(2), the microphone direction (toward the mouth of the person), the distance between the head of the person and the microphone, etc.) may trigger the logic module 400 to classify the detected participant 106(2)-106(M) as actively speaking. If, at 750, the detected participant 106(2)-106(M) is not classified as actively speaking, then the logic module 400 returns to 725 and 730 to perform further object detection and participant detection on the first zoom video output. If, however, the logic module 400 classifies the detected participant 106(2)-106(M) as actively speaking, then the logic module 400 may, at 755 change the display from that of the video output of the first camera 112(1) of the presenter 106(1), to the already queued up altered video output of one of the video cameras 112(2)-112(3) of the close-up view of the detected participant 106(2)-106(M) that is actively speaking into the microphone 118(1)-118(2).

Continuing with FIG. 7, at 760, the logic module 400 continuously reevaluates whether or not the detected participant 106(2)-106(M) is still considered actively speaking. The logic module 400 may be programmed to declassify the detected participant 106(2)-106(M) from actively speaking when the detected participant 106(2)-106(M) has not produced a voice/speech input within a predetermined time period or hold-off period (e.g., 3 seconds) from the last received voice/speech input. If, at 760, the logic module 400 determines that the detected participant 106(2)-106(M) is still actively speaking, then the logic module 400 returns to 755 and continues to display the altered video output of one of the video cameras 112(2)-112(3) of the close-up view of the detected participant 106(2)-106(M). However, if the logic module 400 determines that the detected participant 106(2)-106(M) is no longer actively speaking, then the logic module 400, at 765, utilizes the trained video neural network 410 to determine if the detected participant 106(2)-106(M) and the detected microphone 118(1)-118(2) are still present in the video output of the video cameras 112(2)-112(3). If, at 765, the detected participant 106(2)-106(M) and the detected microphone 118(1)-118(2) are still present in the close-up video output, then the logic module 400 returns to 720 and the analysis of the first zoom alteration of the video cameras 112(2)-112(3). However, if either the detected participant 106(2)-106(M) or the detected microphone 118(1)-118(2), or both, are not present in the video output at 765, then the logic module 400 returns to 710 to being analyzing unaltered video outputs received from the video cameras 112(2)-112(3). Regardless of if the participant 106(2)-106(M) and/or the microphone 118(1)-118(2) are still detected, at this time, the logic module 400 may return to displaying the video output of the first video camera 112(1) of the presenter 106(1), may display one or both of video outputs of the video cameras 112(2)-112(3) of the auditorium overview, or may display one or both of video outputs of the video cameras 112(2)-112(3) after being altered to a first zoom.

Figure 8A:
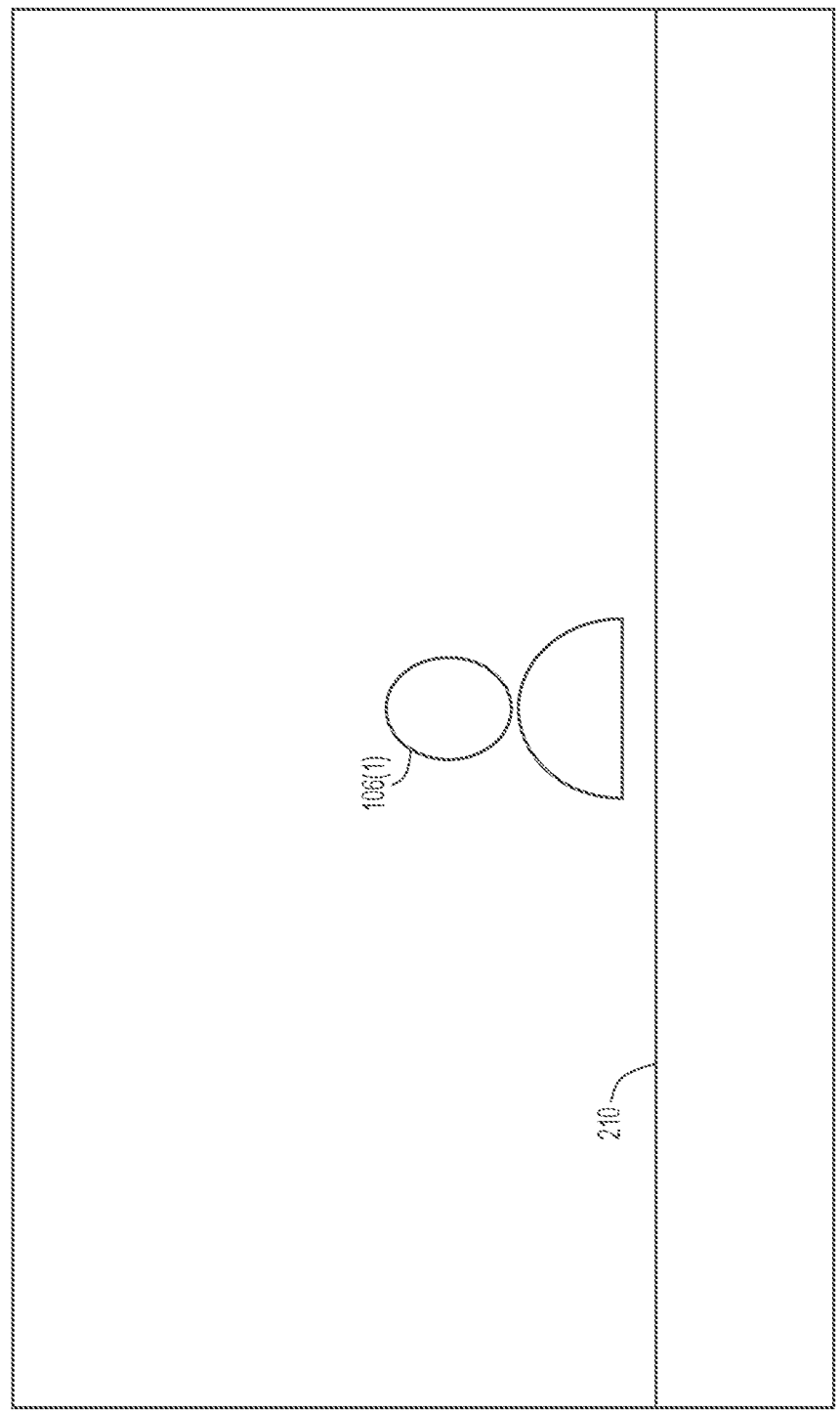
FIG. 8A is an illustration of video output of the presenter, according to an example embodiment.

Turning to FIGS. 8A-8D, and with continued reference to FIGS. 1-7, illustrated are various views of the video camera outputs described above. Illustrated in FIG. 8A is an example embodiment of the video output 800 of the first camera 112(1) displaying the presenter 106(1) on stage 210. As previously explained with regard to step 510 of method 500 and step 610 of method 600, this video output 800 of the first camera 112(1) may be displayed on the displays 114(1)-114(2) of the auditorium endpoint 104(1) deployed in the auditorium 200 and at the far-end video conference endpoints 104(2)-104(N) when the microphones 118(1)-118(2) are not detected in other video camera outputs and/or when the presenter 106(1) is detected as actively speaking.

Illustrated in FIG. 8B is an example embodiment of the video output 810 of the second camera 112(2) or the third camera 112(3) displaying an overview of the participants 106(2)-106(M) in the audience of the auditorium 200. As illustrated in this example embodiment, participant 106(2) is located within proximity of the first microphone 118(1), while participant 106(3) is located within proximity of the second microphone 118(2). The trained video neural network 410 of the logic module 400 may have placed a first bounding box 820 around the detected first microphone 118(1) and a second bounding box 830 around the detected second microphone 118(2) to indicate the detection, location (e.g., in pixels), and size (e.g., in pixels) of the microphones 118(1)-118(2). In accordance with step 525 of method 500 and step 625 of method 600, the video output 810 may be displayed on the displays 114(1)-114(2) of the auditorium endpoint 104(1) deployed in the auditorium 200 and at the far-end video conference endpoints 104(1)-104(N). When the video output 810 of the second and third cameras 112(2)-112(3) are displayed, they may be displayed without the bounding boxes 820, 830 shown in video output 810. The bounding boxes 820, 830 may be utilized by the logic module 400 to determine how to alter the video output 810 to the first zoom and second zoom views of the video output 810.

Figure 8C:
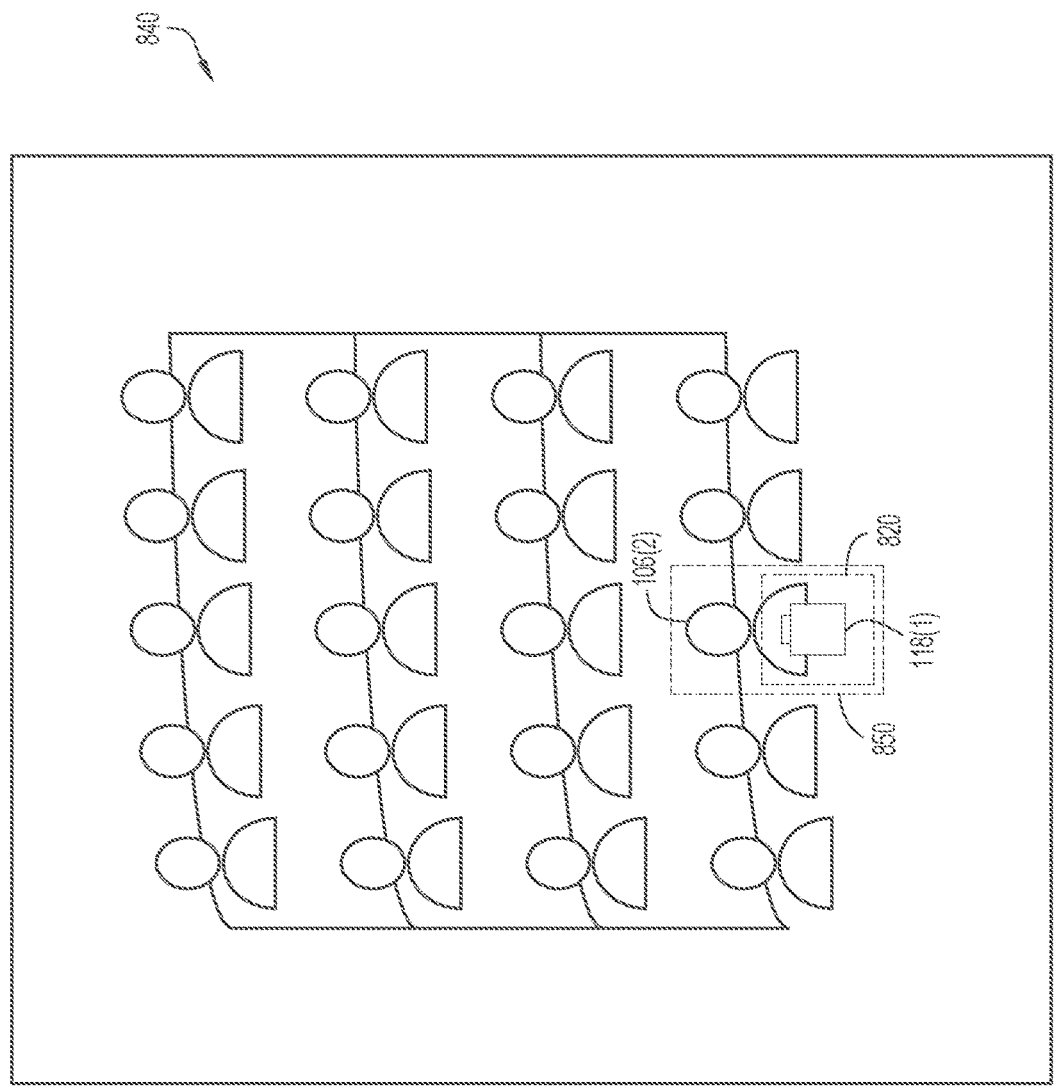
FIG. 8C is an illustration of a first zoom video output of the audience overview, according to an example embodiment.

Illustrated in FIG. 8C is an example embodiment of the video output 840 of the second camera 112(2) or the third camera 112(3) after being altered to a first zoom view from the overview of the participants 106(2)-106(M) in the audience of the auditorium 200 (illustrated in FIG. 8B). When comparing the video output 810 of the overview of the auditorium with the first zoom video output 840, it becomes apparent that the example embodiment of the first zoom video output 840 illustrated in FIG. 8C is a partial zoom on a portion of some of the participants 106(1)-106(M) of the audience in the auditorium 200. More specifically, the first zoom video output 840 is an alteration of the video output 810 of one of the second or third video cameras 112(2)-112(3) to partially zoom in on the bounding box 820 of the detected first microphone 118(1). As further illustrated in FIG. 8C, the trained video neural network 410 of the logic module 400 may have placed the first bounding box 820 around the detected first microphone 118(1) and a third bounding box 850 around the detected participant 106(2) that is within a proximity of the detected first microphone 118(1). As previously explained, these bounding boxes 820, 850 indicate the detection, location (e.g., in pixels), and size (e.g., in pixels) of the detected microphone 118(1) and the detected participant 106(2). In accordance with steps 720-735 of method 700, the video output 840 may be utilized by the logic module 400 to verify the detection of the first microphone 118(1) and the detection of the participant 106(2). Furthermore in accordance with step 740 of method 700, the logic module 400 may display the first zoom video output 840 on the displays 114(1)-114(2) of the auditorium endpoint 104(1) and at the far-end video conference endpoints 104(1)-104(N). If displayed, the first zoom video output 840 of the second and third cameras 112(2)-112(3) may not contain the bounding boxes 820, 850.

Figure 8D:
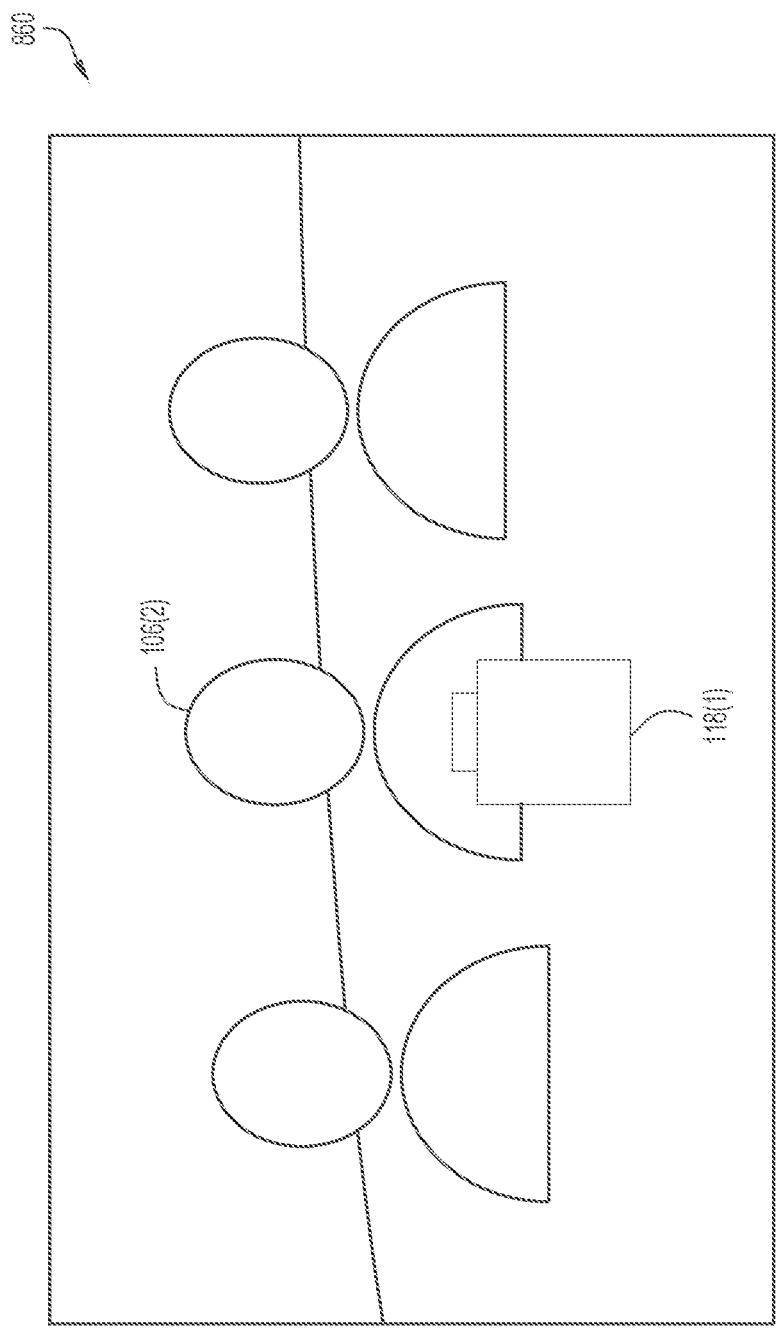
FIG. 8D is an illustration of a second zoom video output of the audience (i.e., a close-up zoom) that shows the actively speaking participant of the audience, according to an example embodiment.

Illustrated in FIG. 8D is an example embodiment of video output 860 of the second camera 112(2) or the third camera 112(3) displaying a second zoom to show a close-up view of the participants 106(2) in proximity to the detected first microphone 118(1). The second zoom video output 860 is an alteration of the video output 810 and/or the first zoom video output 840 of one of the second or third video cameras 112(2)-112(3) to zoom in or reframe the video outputs 810, 840 based on the bounding box 850 of the detected participant 106(2). In accordance with step 530 of method 500, steps 635-640 of method 600, and steps 745-765 of method 700, the second zoom video output 840 may be displayed by the logic module 400 on the displays 114(1)-114(2) of the auditorium endpoint 104(1) and/or at the far-end video conference endpoints 104(1)-104(N). Furthermore, the second zoom video output 840 may be utilized by the logic module in methods 600 and 700 to verify that participant 106(2) is actively speaking and that participant 106(2) and the first microphone 118(1) are still present in the video output of the second and/or third cameras 112(2)-112(3).

In embodiments of the auditorium 200 that contain multiple video cameras that provide an overall view of the auditorium 200 and the participants 106(2)-106(M), such as video cameras 112(2)-112(3), and that contain multiple displays, such as displays 114(1)-114(2), the logic module 400 may only change what is displayed on one of the displays 114(1)-114(2), rather than both displays 114(1)-114(2). For example, in the example embodiment illustrated in FIG. 2, the logic module 400 may determine that display 114(1) may remain as displaying the video output of the first video camera 112(1), which is a view of the presenter 106(1), while determining that display 114(2) should be changed to display the video output of the third video camera 112(3), which is an overview of the audience, when a microphone 118(1)-118(2) is detected in the video output of the third video camera 112(3). In another example, the logic module 400 may determine that display 114(1) may remain as displaying the video output of the first video camera 112(1), which is a view of the presenter 106(1), while determining that display 114(2) should be changed to the video output of the second video camera 112(2), which is the close-up framing of the actively speaking participant 106(2). In yet another example, when the logic module 400 detects at least one the microphones 118(1)-118(2), the logic module 400 may display on the first display 114(1) the video output of the second video camera 112(2), which is an overview of the audience, while the logic module 400 may simultaneously display on the second display 114(2) the video output of the third video camera 112(3), which may be the close-up framing of the actively speaking participant 106(2). Thus, the logic module 400, when determining that the display should be changed in methods 500, 600, and 700, may determine that the video output on only one of the displays 114(1)-114(2) needs to be changed.

Figure 9:
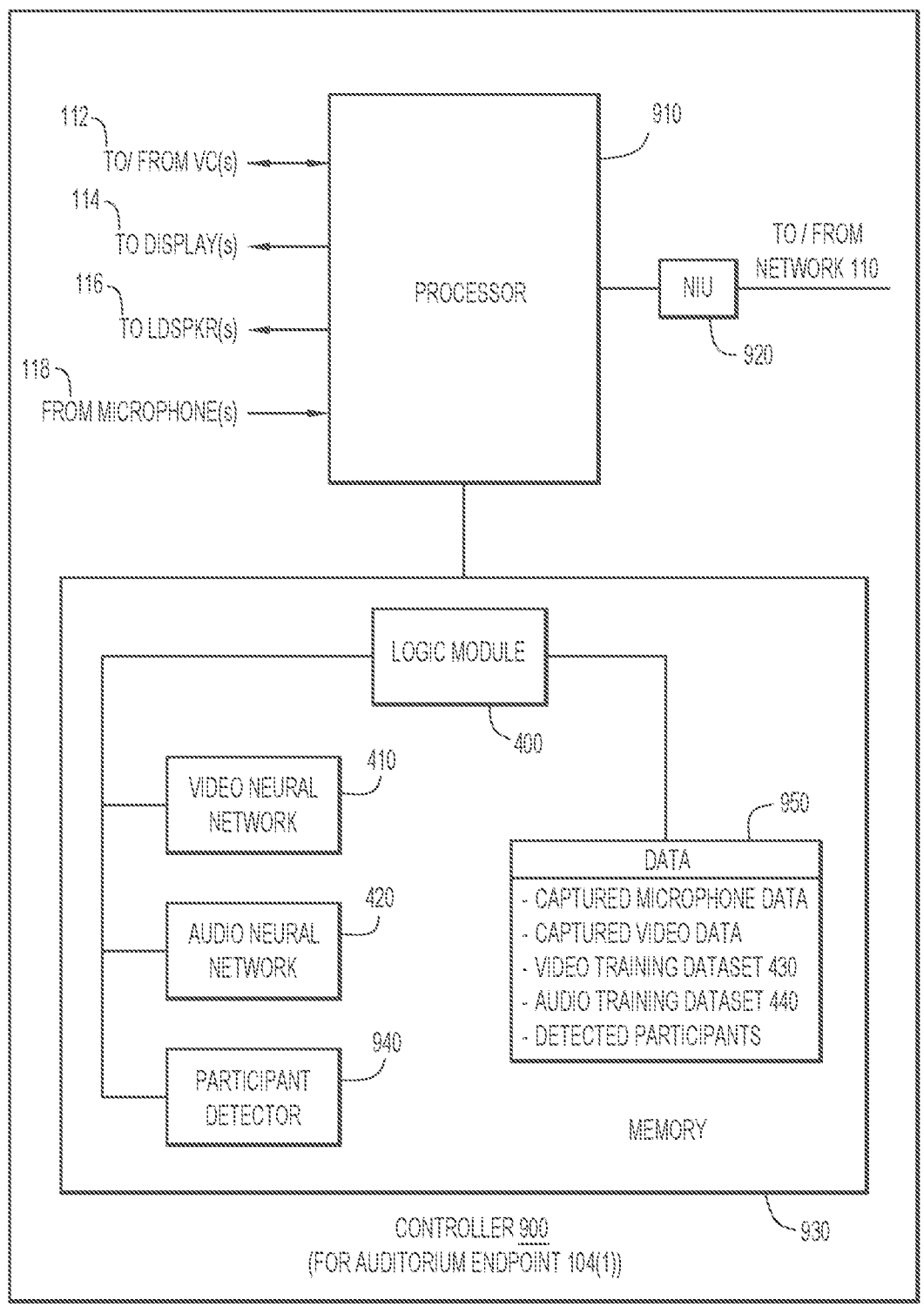
FIG. 9 is a block diagram of the controller of the endpoint, wherein the controller is configured to perform the techniques for determining which video output to display, according to an example embodiment.

Reference is now made to FIG. 9, which shows an example block diagram of the logic controller 900 of the auditorium endpoint 104(1) configured to perform the techniques for determining the video output to display during a presentation presented in an auditorium in accordance with the embodiments described herein. In some embodiments, the controller 900 may be located within auditorium endpoint 104(1). There are numerous possible configurations for the controller 900 and FIG. 9 is meant to be an example. Controller 900 includes a processor 910, a network interface unit 920, and memory 930. The network interface (I/F) unit (NIU) 920 is, for example, an Ethernet card or other interface device that allows the controller 900 to communicate over communication network 110. Network I/F unit 920 may include wired and/or wireless connection capability.

Processor 910 may include a collection of microcontrollers and/or microprocessors, for example, each configured to execute respective software instructions stored in the memory 930. The collection of microcontrollers may include, for example: a video controller to receive, send, and process video signals related to video cameras 112(1)-112(3) and displays 114(1)-114(2); an audio processor to receive, send, and process audio signals related to microphones 118(1)-118(2) and loudspeakers 116(1)-116(2); and a high-level controller to provide overall control. Processor 910 may send pan, tilt, and zoom commands to video cameras 112(1)-112(3), which is responsive to the commands as would be appreciated by one of ordinary skill in the relevant arts. Portions of memory 930 (and the instruction therein) may be integrated with processor 910. In the transmit direction (i.e., in transmitting the events of the auditorium to far-end endpoints 104(2)-104(N)), processor 910 may encode audio/video captured by video cameras 112(1)-112

(3) and microphones 118(1)-118(2), encode the captured audio/video into data packets, encodes the indication of the actively displayed video output and any alterations to the video outputs, and causes the encoded data packets to be transmitted to communication network 110. In the event the auditorium endpoint 104(1) receives data from far-end video conference endpoints 104(2)-104(N), processor 910 may decode audio/video from data packets received from communication network 110 and may cause the audio/video to be presented to participants in the auditorium 200 via displays 114(1)-114(2) and loudspeakers 116(1)-116(2).

The memory 930 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 930 may comprise one or more computer readable storage media (e.g., a memory device) encoded with software comprising computer executable instructions and when the software is executed (by the processor 910) it is operable to perform the operations described herein. For example, the memory 930 stores or is encoded with instructions for logic module 400 to perform overall control of auditorium endpoint 104(1) and operations described herein for determining the video output to display. As previously described, logic module 400 includes video neural network 410 that is configured to be trained to detected microphones within images of the video output of the video cameras 112(1)-112(3), an audio neural network 420 configured to differentiate the audio clips received by the microphones 118(1)-118(2) between voice audio clips and noise audio clips, and a participant detector 940 that utilizes facial detection techniques, upper body detection techniques, motion detection techniques, etc. to detect participants in the images of the video outputs of the video cameras 112(1)-112(3).

In addition, memory 930 stores data 950 used and generated by the neural networks 410, 420 and the detector 940. The data includes, but is not limited to: captured microphone data (e.g., audio files/clips), captured video data (e.g., video outputs from the video cameras 112(1)-112(3)), video training data 430 (i.e., when neural network training is performed by the endpoint 104(1)), audio training data 440 (i.e., when neural network training is performed by the endpoint 104(1)), and the identity of the detected participants.

Figure 10:
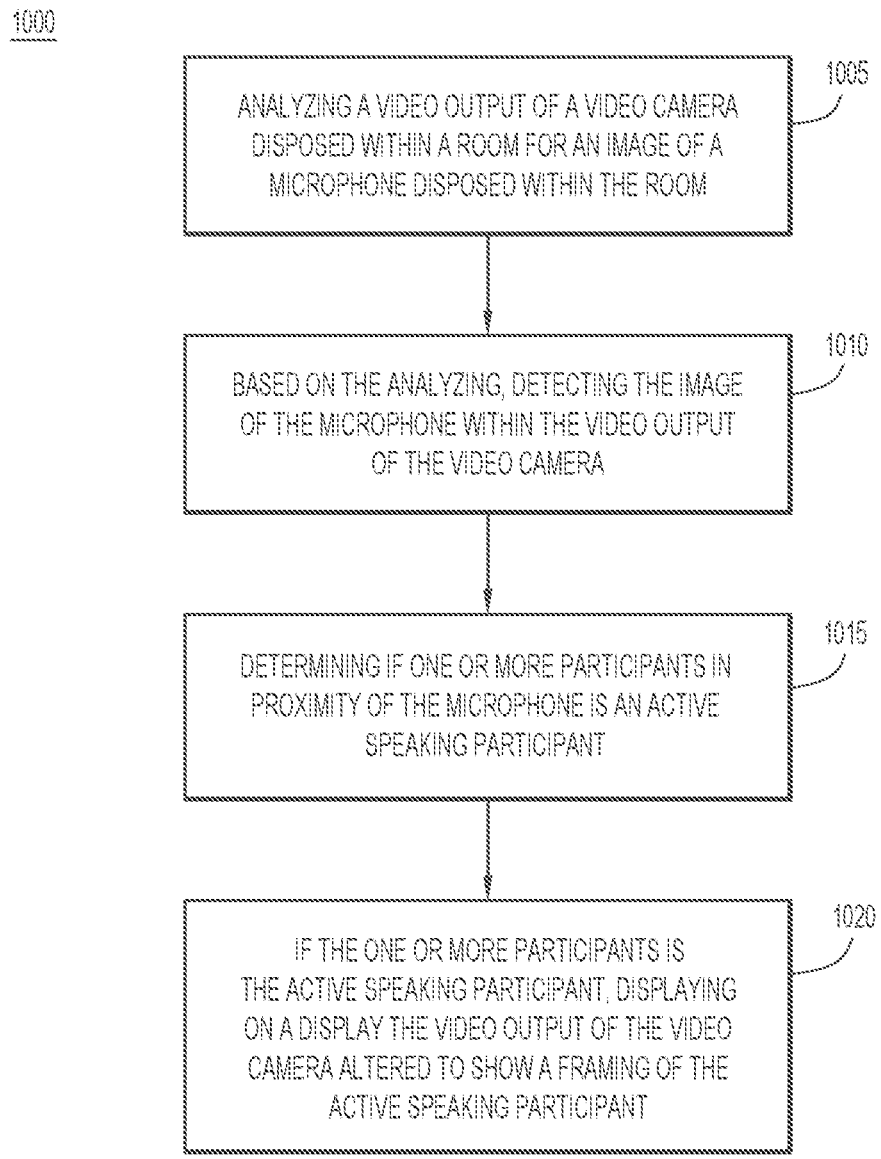
FIG. 10 is a flowchart of a method of choosing which video output of the video cameras disposed within a room to display based on an active speaker in the room, according to an example embodiment.

With reference to FIG. 10, illustrated is a flowchart of a method 1000 performed by the auditorium endpoint 104(1) for detecting a microphone 118(1)-118(2) within a video output of a video camera 112(1)-112(3), determining when the detected microphone 118(1)-118(2) receives voice/speech from a participant 106(2)-106(M), and determining the video output to be displayed at the auditorium 200 and/or at far-end video conference endpoints 104(2)-104(N). Reference is also made to FIGS. 1-7, 8A, 8B, 8C, 8D, and 9 for purposes of the description of FIG. 10. At 1005, the auditorium endpoint 104(1) analyzes a video output from a video camera that is disposed within a room for an image of a microphone disposed within the room. As previously explained and illustrated in FIGS. 2 and 3, the room may be an auditorium 200 that contains multiple video cameras 112(1)-112(3), and in which multiple microphones 118(1)-118(2) that have a unique shape and design may be passed around and repositioned. At 1010, the auditorium endpoint 104(1) may, based on the analyzing in 1005, detect the image of a microphone within the video output of the video camera. As described in FIGS. 4-7, the logic module 400 of the auditorium endpoint 104(1) may utilize a trained video neural network 410 to detect an image of at least one of the microphones 118(1)-118(2) in at least one of the video outputs of video cameras 112(1)-112(3).

At 1015, the auditorium endpoint 104(1) may then determine if one or more participants in the room and in proximity to the microphone is an active speaking participant. As illustrated and explained with regard to FIG. 2, the auditorium 200 holds multiple participants 106(2)-106(N) that are audience members of the presenter 106(1). Furthermore, as explained with regard to FIGS. 4-7, in one embodiment, the logic module 400 of the auditorium endpoint 104(1) may utilize the trained audio neural network 420 to determine an active speaking participant by detecting whether the microphone detected in 1010 is receiving voice/speech input from an actively speaking participant 106(2)-106(M), is receiving a noise input, or is receiving no input (e.g., silence). At 1020, if the one or more participants is the actively speaking participant, then the auditorium endpoint 104(1) may display the video output of the video camera that has been altered to show a framing of the actively speaking participant. As described in FIGS. 5-7, 8B, 8C, and 8D, once a participant 106(2) is detected as actively speaking into the detected microphone 118(1)-118(2), the logic module 400 may alter the video output of one of the video cameras 112(2)-112(3) to digitally zoom in on the actively speaking participant 106(2), may perform an optical zoom with one of the video cameras 112(2)-112(3) to provide a close-up view of the actively speaking participant 106(2), or may perform a reframing of the video output of one of the video cameras 112(2)-112(3) to provide a close-up framing of the actively speaking participant 106(2).

In summary, during presentations within auditoriums or other large roomed venues, especially those with interactive portions that engage the audience (e.g., question and answer portions of a presentation), currently available speaker tracking systems are not able to properly scale to the large number of participants located within the audience. Therefore, when a member of the audience wishes to participate in the presentation, that member must be identified by a person manning a camera as well as by a person running microphones to members of the audience. This degrades the audience experience during the presentation, especially during any interactive portions (e.g., question and answer portions) of the presentation, as there typically is a noticeable delay in the display of a video output of the member of the audience interacting in the presentation. Thus, this may result in other audience members missing audio/video of the audience member interacting with the presentation, or may result in a significant amount of downtime or dead time, when no one is speaking (i.e., waiting for the cameraman and microphone runner to locate the audience member). According to one embodiment, presented herein is a method for an auditorium endpoint to use uniquely designed microphones that may be passed or tossed around the auditorium and video cameras equipped in the auditorium to track the microphones and automatically switch a display from the presenter of the presentation to an audience member that is participating/interacting with the presentation. The methods presented herein enables the auditorium endpoint to automatically display any person that is actively speaking into a detected microphone in the audience, regardless of where that audience member is located within the audience.

In one form, a method is provided comprising: analyzing, by an endpoint, a video output of a video camera disposed within a room for an image of a microphone disposed within the room; based on the analyzing, detecting, by the endpoint, the image of the microphone within the video output of the video camera; determining, by the endpoint, if one or more participants in proximity of the microphone is an active speaking participant; and if the one or more participants is the active speaking participant, displaying on a display the video output of the video camera altered to show a framing of the active speaking participant.

In another form, an apparatus is provided comprising: a network interface unit that enables communication over a network by an endpoint; and a processor coupled to the network interface unit, the processor configured to: analyze a video output of a video camera disposed within a room for an image of a microphone disposed within the room; based on the analyze, detect the image of the microphone within the video output of the video camera; determine if one or more participants in proximity of the microphone is an active speaking participant; and if the one or more participants is the active speaking participant, display on a display the video output of the video camera altered to show a framing of the active speaking participant.

In yet another form, a non-transitory processor readable medium is provided. The medium stores instructions that, when executed by a processor, cause the processor to: analyze a video output of a video camera disposed within a room for an image of a microphone disposed within the room; based on the analyze, detect the image of the microphone within the video output of the video camera; determine if one or more participants in proximity of the microphone is an active speaking participant; and if the one or more participants is the active speaking participant, display on a display the video output of the video camera altered to show a framing of the active speaking participant.

The above description is intended by way of example only. Various modifications and structural changes may be made therein without departing from the scope of the concepts described herein and within the scope and range of equivalents of the claims.

What is claimed is:

1. A method comprising:
   prior to analyzing a video output of a video camera disposed within a room for an image of a microphone disposed within the room, detecting, by an endpoint, if a presenter within the room is actively speaking;
   if the presenter is actively speaking, displaying the presenter on a display;
   if the presenter is not actively speaking, analyzing, by the endpoint, the video output of the video camera disposed within the room for the image of the microphone disposed within the room;
   based on the analyzing, detecting, by the endpoint, the image of the microphone within the video output of the video camera;
   determining, by the endpoint, if one or more participants in proximity of the microphone is an active speaking participant; and
   if the one or more participants is the active speaking participant, displaying on the display the video output of the video camera altered to show a framing of the active speaking participant.

2. The method of claim 1, wherein the room is an auditorium, and the microphone is a wireless microphone that is repositionable throughout the auditorium.

3. The method of claim 1, wherein the video camera is a first video camera, the video output of the first video camera is a first video output, and the first video output of the first video camera altered to show the framing of the active speaking participant is displayed simultaneously with a second video output of a second video camera of the room being displayed.

4. The method of claim 1, further comprising, after detecting the image of the microphone:
   displaying on the display an overview video output of the room containing the one or more participants.

5. The method of claim 4, further comprising, prior to determining if the one or more participants is the active speaking participant:
   altering the video output of the video camera from the overview video output to a first zoomed video output;
   displaying on the display the first zoomed video output; and
   performing, by the endpoint, a validation detection of the microphone on the first zoomed video output.

6. The method of claim 5, wherein the validation detection further comprises:
   performing, by the endpoint, facial detection techniques of the active speaking participant within a predetermined location with respect to the microphone.

7. The method of claim 5, wherein determining if the one or more participants in proximity of the microphone is the active speaking participant comprises:
   determining, by the endpoint, if the microphone is receiving speech from the active speaking participant.

8. The method of claim 5, further comprising:
   if the detection of the microphone is validated on the first zoomed video output and the active speaking participant is determined, altering the video output of the video camera a second time to a second zoomed video output that differs from the first zoomed video output, the second zoomed video output being a closer zoom of the microphone than the first zoomed video output; and
   performing, by the endpoint, a second validation detection of the microphone on the second zoomed video output.

9. The method of claim 1, wherein the endpoint is a near-end video conference endpoint that is configured to communicate with one or more far-end video conference endpoints, and wherein the display is located at one of the one or more far-end video conference endpoints.

10. The method of claim 1, wherein the video camera is a first video camera configured to output video of the one or more participants disposed in the room, the room further comprising:
    a second video camera configured to output video of the one or more participants disposed in the room; and
    a third video camera configured to output video of the presenter disposed in the room.

11. An apparatus comprising:
    a network interface unit that enables communication over a network on behalf of an endpoint; and
    a processor coupled to the network interface unit, the processor configured to:
      prior to analyzing a video output of a video camera disposed within a room for an image of a microphone disposed within the room, detect if a presenter within the room is actively speaking;
      if the presenter is actively speaking, display the presenter on a display;
      if the presenter is not actively speaking, analyze the video output of the video camera disposed within the room for the image of the microphone disposed within the room;
      based on the analyze, detect the image of the microphone within the video output of the video camera;

determine if one or more participants in proximity of the microphone is an active speaking participant; and if the one or more participants is the active speaking participant, display on the display the video output of the video camera altered to show a framing of the active speaking participant.

12. The apparatus of claim 11, wherein the room is an auditorium and the microphone is a wireless microphone that is repositionable throughout the room.

13. The apparatus of claim 11, wherein, after detection of the image of the microphone, the processor is further configured to:

display on the display an overview video output of the room containing the one or more participants.

14. The apparatus of claim 13, wherein, prior to determination if the one or more participants is the active speaking participant, the processor is further configured to:

alter the video output of the video camera from the overview video output to a first zoomed video output;

display on the display the first zoomed video output; and perform a validation detection of the microphone on the first zoomed video output.

15. The apparatus of claim 14, wherein, when performing the validation detection, the processor is further configured to:

perform facial detection techniques of the active speaking participant within a predetermined location with respect to the microphone.

16. The apparatus of claim 14, wherein, when determining if the one or more participants in proximity of the microphone is the active speaking participant, the processor is further configured to:

determine if the microphone is receiving speech from the active speaking participant.

17. The apparatus of claim 14, the processor is further configured to:

if the detection of the microphone is validated on the first zoomed video output and the active speaking participant is determined, alter the video output of the video camera a second time to a second zoomed video output that differs from the first zoomed video output, the second zoomed video output being a closer zoom of the microphone than the first zoomed video output; and perform a second validation detection of the microphone on the second zoomed video output.

18. A non-transitory processor readable medium storing instructions that, when executed by a processor, cause the processor to:

prior to analyzing a video output of a video camera disposed within a room for an image of a microphone disposed within the room, detect if a presenter within the room is actively speaking;

if the presenter is actively speaking, display the presenter on a display;

if the presenter is not actively speaking, analyze the video output of the video camera disposed within the room for the image of the microphone disposed within the room;

based on the analyze, detect the image of the microphone within the video output of the video camera;

determine if one or more participants in proximity of the microphone is an active speaking participant; and if the one or more participants is the active speaking participant, display on the display the video output of the video camera altered to show a framing of the active speaking participant.

19. The non-transitory processor readable medium of claim 18, further comprising, after detection of the image of the microphone, instructions that, when executed by the processor, cause the processor to:

display on the display an overview video output of the room containing the one or more participants.

20. The non-transitory processor readable medium of claim 19, further comprising, prior to the determination if the one or more participants is the active speaking participant, instructions that, when executed by the processor, cause the processor to:

alter the video output of the video camera from the overview video output to a first zoomed video output;

display on the display the first zoomed video output; and perform a validation detection of the microphone on the first zoomed video output.

* * * * *